(12) United States Patent
Philippe et al.

(10) Patent No.: US 10,911,784 B2
(45) Date of Patent: Feb. 2, 2021

(54) METHOD OF CODING AND DECODING IMAGES, DEVICE FOR CODING AND DECODING IMAGES AND COMPUTER PROGRAMMES CORRESPONDING THERETO

(71) Applicant: Orange, Paris (FR)

(72) Inventors: Pierrick Philippe, Melesse (FR); Adria Arrufat, Seoul (KR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 16/728,640

(22) Filed: Dec. 27, 2019

(65) Prior Publication Data

US 2020/0137419 A1 Apr. 30, 2020

Related U.S. Application Data

(63) Continuation of application No. 15/756,349, filed as application No. PCT/FR2016/052128 on Aug. 26, 2016, now Pat. No. 10,523,969.

(30) Foreign Application Priority Data

Aug. 31, 2015 (FR) .................................. 15 58066

(51) Int. Cl.
*H04N 19/61* (2014.01)
*H04N 19/176* (2014.01)
(Continued)

(52) U.S. Cl.
CPC ........... *H04N 19/61* (2014.11); *H04N 19/103* (2014.11); *H04N 19/12* (2014.11); *H04N 19/157* (2014.11); *H04N 19/176* (2014.11)

(58) Field of Classification Search
CPC ..... H04N 19/61; H04N 19/176; H04N 19/103
See application file for complete search history.

(56) References Cited

U.S. PATENT DOCUMENTS

2007/0171978 A1* 7/2007 Chono ................... H04N 19/11
375/240.18
2008/0008235 A1 1/2008 Segall
2013/0177077 A1 7/2013 Yeo et al.
(Continued)

FOREIGN PATENT DOCUMENTS

GB 2510289 A 7/2014
WO 2013055040 A1 4/2013
WO 2015079179 A1 6/2015

OTHER PUBLICATIONS

International Search Report dated Feb. 16, 2017 for corresponding International Application No. PCT/FR2016/052128, filed Aug. 26, 2016.
(Continued)

*Primary Examiner* — Shawn S An
(74) *Attorney, Agent, or Firm* — David D. Brush; Westman, Champlin & Koehler, P.A.

(57) ABSTRACT

A method of coding at least one image sliced into blocks. The method implements, for a current block to be coded: predicting the current block in accordance with a prediction mode selected from among predetermined prediction modes, Intra and Inter, the selected mode of prediction being Intra; calculating a residual data block representative of a difference between a predictor block obtained on completion of the prediction and the current block; applying a transform operation to the data of the residual block, the transform operation belonging to a set of transform operations previously stored in association with the selected mode of Intra prediction; and coding the data obtained from the transform operation. The number of transform operations contained in the set associated with the selected Intra mode is different from the number of transform operations contained in a set of transform operations stored in association with the mode of Inter prediction.

12 Claims, 12 Drawing Sheets

(51) Int. Cl.
  *H04N 19/103* (2014.01)
  *H04N 19/157* (2014.01)
  *H04N 19/12* (2014.01)

(56) References Cited

U.S. PATENT DOCUMENTS

2013/0287312 A1  10/2013  Minezawa et al.
2016/0309158 A1  10/2016  Philippe et al.

OTHER PUBLICATIONS

English translation of the International Written Opinion dated Feb. 16, 2017 for corresponding International Application No. PCT/FR2016/052128, filed Aug. 26, 2016.

Yeo C et al., "Choice of transforms in MDDT for unified intra prediction". 3. JCT-VC Meeting; 94. MPEG Meeting; Jul. 10, 2010-Oct. 15, 2010; Guangzhou; (Joint Collaborative Team on Video Coding of ISO/IECJTC1/SC29/WG11 and ITU-T SG.16 ); URL: Http://Wftp3.Itu.Int/Av-Arch/Jctvc-Site/,, No. JCTVC-C039, Oct. 1, 2010 (Oct. 1, 2010), XP030007746.

Yeo C et al., "Mode-dependent fast separable KLT for block-based intra coding". 2. JCT-VC Meeting; Jul. 21-28, 2010; Geneva; (Joint Collaborative Team on Video Coding of ISO/IEC JTC1/SC29/WG11 and ITU-T SG.16 ); URL:Http://Wftp3.Itu.Int/Av-Arch/Jctvc-Sit E/,, No. JCTVC-B024. Jul. 23, 2010 (Jul. 23, 2010). XP030007604.

Office Action dated Feb. 28, 2018 for corresponding U.S. Appl. No. 15/756,349, filed Feb. 28, 2018.

Notice of Allowance dated Aug. 12, 2019 for corresponding U.S. Appl. No. 15/756,349, filed Feb. 28, 2018.

\* cited by examiner

METHOD OF CODING AND DECODING IMAGES, DEVICE FOR CODING AND DECODING IMAGES AND COMPUTER PROGRAMMES CORRESPONDING THERETO

CROSS-REFERENCE TO RELATED APPLICATIONS

This Application is a continuation of U.S. application Ser. No. 15/756,349, filed Feb. 28, 2018, which is a Section 371 National Stage Application of International Application No. PCT/FR2016/052128, filed Aug. 26, 2016 and published as WO 2017/037368 A2 on Mar. 9, 2017, not in English, which are incorporated herein by reference in their entireties.

FIELD OF THE INVENTION

The present invention pertains generally to the field of image processing, and more precisely to the coding and to the decoding of digital images and of sequences of digital images.

The coding/decoding of digital images applies in particular to images arising from at least one video sequence comprising:
- images arising from one and the same camera and following one another temporally (coding/decoding of 2D type),
- images arising from various cameras oriented according to different views (coding/decoding of 3D type),
- corresponding components of texture and of depth (coding/decoding of 3D type),
- etc.

The present invention applies in a similar manner to the coding/decoding of images of 2D or 3D type.

The invention can in particular, but not exclusively, be applied to the video coding implemented in AVC and HEVC current video coders and their extensions (MVC, 3D-AVC, MV-HEVC, 3D-HEVC, etc.), and to the corresponding decoding.

PRIOR ART

Current video coders (MPEG, H.264, HEVC, etc.) use a blockwise representation of the video sequence. The images are split up into blocks, which are liable to be split up again in a recursive manner. Next, each block is coded by intra-image or inter-image prediction. Thus, certain images are coded by spatial prediction (Intra prediction), other images are also coded by temporal prediction (Inter prediction) with respect to one or more coded-decoded reference images, with the aid of motion compensation known to the person skilled in the art.

A residual block, also called a prediction residual, corresponding to the original block decreased by a prediction, is coded for each block. Let us note that in a particular case, the prediction can be omitted, the residual block then being equivalent to the original block. The residual blocks are transformed with the aid of a mathematical transform operation, and then quantized with the aid of a mathematical quantization operation for example of scalar type. For the sake of simplification, the mathematical transform operation will be called hereinafter "transform" and the mathematical quantization operation will be called hereinafter "quantization".

Coefficients are obtained on completion of the quantization step. They are thereafter traversed in an order of reading which depends on the mode of coding which has been chosen. In the HEVC standard, for example, the order of reading is dependent on the prediction carried out and can be performed in the "horizontal", "vertical" or "diagonal" order.

On completion of the aforementioned traversal, a one-dimensional list of coefficients is obtained. The coefficients of this list are then coded in the form of bits by an entropy coding the aim of which is to code the coefficients without loss.

The bits obtained after entropy coding are written into a data signal or stream which is intended to be transmitted to the decoder.

In a manner known per se, such a signal comprises:
- the quantized coefficients contained in the aforementioned list,
- information representative of the mode of coding used, in particular:
  - the mode of prediction (Intra prediction, Inter prediction, default prediction carrying out a prediction for which no information is transmitted to the decoder (known as "skip"));
  - information specifying the type of prediction (orientation, reference image, etc.);
  - the type of splitting of the block;
  - the motion information if necessary;
  - etc.

Once the stream has been received by the decoder, the decoding is done image by image, and, for each image, block by block. For each block, the corresponding elements of the stream are read. The inverse quantization and the inverse transform of the coefficients of the blocks are performed so as to produce the decoded prediction residual. Next, the prediction of the block is calculated and the block is reconstructed by adding the prediction to the decoded prediction residual.

Admittedly, the conventional coding/decoding technique which has just been described allows improvements in coding performance. According to the video context, it allows in particular:
- an improvement in the quality of the images for a given bitrate of the network used to transmit the images,
- a reduction in the bitrate of transmission of the images for an image quality criterion fixed beforehand.

However, such coding performance is not currently optimized and might be further improved, in particular from the point of view of obtaining the best memory resources/coding performance compromise.

In particular, such optimization could relate to the aforementioned transform. This is conventionally a linear transform which, when applied to a residual block containing a determined number of K pixels (K≥1), makes it possible to obtain a set of K coefficients. In current video coders/decoders (MPEG, H.264, HEVC, etc.), a single transform is stored in association with a given mode of prediction.

In the field of video coding, discrete cosine transforms (DCTs) or discrete sine transforms (DSTs), are generally favored, in particular for the following reasons:
- these are block transforms and it is thus easy to manipulate the blocks independently of one another,
- they are efficient for compacting the information in the frequency domain, where the bitrate reduction operation operates.

In a conventional manner, such a transform can be of separable or non-separable type.

Dealing with a transform of separable type, there is undertaken, according to a first case, the application of a first transform Al to a residual block x of K pixels which are organized in the form of an M×N matrix, where Al is a data matrix of size M×M and M, N are natural integers greater than or equal to 1. A first transformed block Al.x is obtained on completion of the application of this first transform.

A transposition operation t is thereafter applied to the transformed block Al.x. A transposed block $(Al.x)^t$ is obtained on completion of this transposition. Finally, a second transform Ac is applied to the transposed block $(Al.x)^t$, where Ac is a data matrix of size N×N. A second transformed block X of K=N×M pixels is obtained on completion of the application of this second transform, such that:

$$X=Ac \cdot (Al \cdot x)^t$$

According to a second case, the order of application of the transforms Al and Ac is reversed. The second transformed block X of K=N×M pixels may then be written in the following manner:

$$X=Al \cdot (Ac \cdot x^t)^t$$

The transformed block X obtained according to this second case is similar to the transformed block X obtained according to the first case, to within a transposition.

In the particular case where the residual block x is square, that is to say M=N, the matrices Al and Ac have the same size.

On decoding, in a manner known per se, transforms inverse to those mentioned hereinabove are applied.

Thus, if the transform has been applied according to the first case, the corresponding inverse transform makes it possible to obtain the residual block x with the aid of the following calculation:

$$x=Al^{-1} \cdot (Ac^{-1} \cdot X)^t$$

Thus, if the transform has been applied according to the second case, the corresponding inverse transform makes it possible to obtain the residual block x with the aid of the following calculation:

$$x=(Ac^{-1} \cdot (Al^{-1} \cdot X)^t)^t$$

$Al^{-1}$ and $Ac^{-1}$ represent the respective inverse transforms of the transforms Al and Ac. They make it possible to obtain the values of the residual block x on the basis of the values of the transformed block X. The matrices $Al^{-1}$ and $Ac^{-1}$ are commonly called inverse matrices of Al and Ac respectively, in the case where the matrices are chosen orthogonal they correspond to the transposed matrices of Al and Ac respectively.

Dealing with a transform of non-separable type, it may be written on coding as the multiplication of the residual block x, cast in the form of a vector of dimension 1×K, by a matrix A of size K×K. The transformed block X obtained on completion of the application of this transform may then be written in the following manner:

$$X=A \cdot x$$

On decoding, the inverse transform consists in multiplying the transformed block X by the inverse matrix $A^{-1}$ of A which may be the transpose of A, when A is orthogonal. Such an inverse transform makes it possible to obtain the following residual block x:

$$x=A^{-1} \cdot X$$

In the field of video coding, it has been proposed, in particular in the publication "*Non-separable mode dependent transforms for Intra coding in HEVC*, Adrià Arrufat et al. VCIP 2014" to increase the number of transforms per proposed modes of prediction. Thus, within the framework of a spatial prediction in accordance with the HEVC standard, which can be implemented according to thirty-five different modes of spatial prediction, it is proposed to store 16 transforms in association with each of the 35 modes of prediction respectively. When a mode of prediction is selected, a transform is selected from among the 16 transforms stored for this mode of prediction, according to a predetermined coding performance criterion, such as the bitrate-distortion criterion well known to the person skilled in the art.

Thus, for each prediction considered, the transform application step is best adapted to the nature of the prediction residual signals and the coding performance is improved according to the distortion criteria for a given bitrate which are well known to the person skilled in the art.

However, with such an approach, the amount of transforms to be added so as to be able to implement such an adaptation has an impact on the memory resources to be used at one and the same time at the coder which must store the transforms for each of the predictions considered, and at the decoder which must also know the transforms so as to apply the inverse transform of that applied on coding.

Thus, if the case of separable transforms is considered, this being the general framework in video coding, the storage need can be estimated according to a total number NT of transforms, such that $NT=n*N_{MP}$ where n is the number of transforms to be provided per mode of prediction and $N_{MP}$ is the number of proposed modes of prediction. More particularly in the case of an HEVC coding using for example transforms of size 8×8, whose coefficients are stored on one byte, it is necessary to store 2 transforms (vertical and horizontal) thereby requiring at least $(2*8*8*n*N_{MP})/1024=4.375$ kilobytes, where n=1 and $N_{MP}=35$.

This configuration is represented in the first row of the table hereinbelow. For this configuration, the coding performance obtained is also represented. This performance corresponds to the bitrate gain, that is to say to the percentage bitrate reduction obtained without affecting the coding performance (at constant distortion). The following rows represent the evolution of the memory resources required when respectively two, four, eight, sixteen 8×8 transforms are stored in association with each of the 35 modes of spatial prediction, as well as the corresponding coding performance.

It should be noted that,

| Number n of transforms/ mode of prediction | Total number NT of transforms | amount of memory required | Bitrate gain |
| --- | --- | --- | --- |
| 1 | 35 | 4.375 kb | 0.84% |
| 2 | 70 | 8.75 kb | 1.33% |
| 4 | 140 | 17.5 kb | 1.72% |
| 8 | 280 | 35 kb | 2.10% |
| 16 | 560 | 70 kb | 2.48% | according to the table hereinabove, the amount of memory increases linearly with the number of transforms to be provided per mode of prediction and becomes significant in comparison with the amount of storage required for current coders, such as for example HEVC coders, for which the amount of memory devoted to the storage of the transforms is about 1 kb.

Furthermore, it is observed that the highest coding performance (bitrate gain of 2.48%) requires a non-negligible amount of memory of 560 kb relative to the maximum amount of memory of 1 kb required in HEVC.

Even if the bitrate gain of 2.48% turns out to be beneficial, a memory of capacity 70 kb for storing 560 transforms in order to obtain such a gain turns out to be far too expensive, given that the memories used for the hardware implementation of video coding/decoding systems must be fast as regards the amount of data processed.

SUBJECT AND SUMMARY OF THE INVENTION

One of the aims of the invention is to remedy drawbacks of the aforementioned prior art.

For this purpose, a subject of the present invention relates to a method of coding at least one image split up into blocks, implementing, for a current block to be coded of the image:
- a prediction of the current block in accordance with a mode of prediction selected from among a plurality of predetermined modes of prediction,
- a calculation of a residual data block representative of a difference between a predictor block obtained on completion of the prediction and the current block,
- an application of a transform operation to the data of said residual block, said transform operation belonging to a set of transform operations which is stored beforehand in association with a selected mode of prediction,
- a coding of the data obtained subsequent to said transform operation.

Such a coding method is noteworthy in that during the storage of the set of transform operations which is associated with the selected mode of prediction, the number of transform operations contained in this set is different from the number of transform operations contained in a set of transform operations which is stored in association with at least one other predetermined mode of prediction of the plurality of predetermined modes of prediction.

Such an arrangement makes it possible, when there exist several transform operations per mode of prediction:
- either to significantly reduce the memory resources of the coder with a view to the storage of the transform matrices relative to the memory resources of the coders of the prior art, without thereby impairing the coding performance in respect of the current block,
- or to increase the coding performance in respect of the current block without thereby requiring an increase in the memory resources of the coder with a view to the storage of the transform matrices, relative to the memory resources of the coders of the prior art.

According to a particular embodiment, for at least two sets of transform operations which are stored respectively in association with two modes of prediction of the plurality of predetermined modes of prediction, the number of transform operations in each of said two sets contains in common at least one identical transform operation.

Such an arrangement makes it possible to further reduce the memory resources of the coder with a view to the storage of the transform matrices.

Thus for example, within the framework of the HEVC standard, at least two sets of transform operations could contain in common:
- a single transform operation, for example a transform of DCT type,
- two transform operations, for example a transform of DCT type and a transform of DST type,
- etc.

According to another particular embodiment, the set of transform operations which is associated with the selected mode of prediction is stored in association with at least one other mode of prediction of the plurality of predetermined modes of prediction.

Such an arrangement makes it possible to reduce still further the memory resources of the coder with a view to the storage of the transform matrices.

The invention proposes various ways of determining the number of transform operations as a function of the mode of prediction, so as to optimize the "memory resources/coding performance" compromise.

According to a particular embodiment, the number of transform operations which is determined in the case of a mode of prediction associated with a vertical or horizontal direction of prediction is greater than the number of transform operations which is determined in the case of a mode of prediction associated with an oblique direction of prediction.

According to another particular embodiment, the number of transform operations, which is determined in the case of a mode of prediction for which the prediction is calculated by averaging more than two pixels of an edge of the current block, is greater than or equal to the number of transform operations which is determined for any other mode of prediction.

According to yet another particular embodiment, the number of transform operations which is determined in the case of a mode of prediction which has been selected beforehand, in the plurality of predetermined modes of prediction, as most probable mode of prediction, is greater than the number of transform operations which is determined in the case of a mode of prediction which has not been selected beforehand as most probable mode of prediction.

According to yet another particular embodiment, the number of transform operations contained in the set of transform operations which is stored in association with the selected mode of prediction is determined as a function of the amount of information representative of the selected mode of prediction.

The latter arrangement furthermore makes it possible to calculate simply and in a manner which is optimal in terms of "memory resources/coding performance" compromise the number of transform operations to be used for a given predetermined mode of prediction.

The various aforementioned modes or characteristics of embodiment can be added, independently or in combination with one another, to the steps of the above-defined coding method.

The invention also relates to a device for coding at least one image split up into blocks, comprising a processing circuit which, for a current block to be coded of the image, is designed to:
- predict the current block in accordance with a mode of prediction selected from among a plurality of predetermined modes of prediction,
- calculate a residual data block representative of a difference between a predictor block obtained on completion of the prediction and the current block,
- apply a transform operation to the data of the residual block, the transform operation belonging to a set of transform operations which is stored beforehand in association with the selected mode of prediction, code the data obtained subsequent to the transform operation.

The coding device according to the invention is noteworthy in that the processing circuit is designed to store the set of transform operations which is associated with the selected mode of prediction, the number of transform operations contained in this set being different from the number of transform operations contained in a set of transform operations which is stored in association with at least one other predetermined mode of prediction of the plurality of predetermined modes of prediction.

Such a coding device is in particular able to implement the aforementioned coding method.

The invention also relates to a method of decoding a data signal representative of at least one image split up into blocks, implementing, for a current block to be decoded:
  a determination, in the data signal:
    of data representative of a current residual block associated with the current block to be decoded,
    of a mode of prediction of the current block to be decoded, this mode of prediction belonging to a plurality of predetermined modes of prediction,
  a prediction of the current block in accordance with the determined mode of prediction,
  an application of a transform operation to the data representative of the residual block, such a transform operation belonging to a set of transform operations which is stored beforehand in association with the determined mode of prediction,
  a reconstruction of the current block with the aid of a predictor block obtained on completion of the prediction and of the data obtained subsequent to said transform operation.

Such a decoding method is noteworthy in that during the storage of the set of transform operations which is associated with the determined mode of prediction, the number of transform operations contained in this set is different from the number of transform operations contained in a set of transform operations which is stored in association with at least one other predetermined mode of prediction of the plurality of predetermined modes of prediction.

In a similar manner to the coder, such an arrangement is advantageous to the decoder which must also know the transforms so as to apply the inverse transform of that applied on coding. In particular, such an arrangement makes it possible, when there exist several transform operations per mode of prediction:
  either to significantly reduce the memory resources of the decoder with a view to the storage of the transform matrices relative to the memory resources of the decoders of the prior art, without thereby impairing the quality of reconstruction of the current block,
  or to increase the quality of reconstruction of the current block without thereby requiring an increase in the memory resources of the decoder with a view to the storage of the transform matrices relative to the memory resources of the decoders of the prior art.

According to a particular embodiment, for at least two sets of transform operations which are stored respectively in association with two modes of prediction of the plurality of predetermined modes of prediction, the number of transform operations in each of the two sets contains in common at least one identical transform operation.

According to another particular embodiment, the set of transform operations which is associated with the determined mode of prediction is stored in association with at least one other mode of prediction of the plurality of predetermined modes of prediction.

According to yet another particular embodiment, the number of transform operations which is determined in the case of a mode of prediction associated with a vertical or horizontal direction of prediction is greater than the number of transform operations which is determined in the case of a mode of prediction associated with an oblique direction of prediction.

According to yet another particular embodiment, the number of transform operations, which is determined in the case of a mode of prediction for which the prediction is calculated by averaging more than two pixels of an edge of the current block, is greater than or equal to the number of transform operations which is determined for any other mode of prediction.

According to yet another particular embodiment, the number of transform operations which is determined in the case where the determined mode of prediction has been selected beforehand, in the plurality of predetermined modes of prediction, as most probable mode of prediction, is greater than the number of transform operations which is determined in the case where the determined mode of prediction has not been selected beforehand as most probable mode of prediction.

According to yet another particular embodiment, the number of transform operations contained in the set of transform operations which is stored in association with the determined mode of prediction is determined as a function of the amount of information representative of the determined mode of prediction.

The various aforementioned modes or characteristics of embodiment can be added, independently or in combination with one another, to the steps of the above-defined decoding method.

The invention also relates to a device for decoding a data signal representative of at least one image split up into blocks, comprising a processing circuit which, for a current block to be decoded, is designed to:
  determine, in the data signal:
    data representative of a current residual block associated with the current block to be decoded,
    a mode of prediction of the current block to be decoded, this mode of prediction belonging to a plurality of predetermined modes of prediction,
  predict the current block in accordance with the determined mode of prediction,
  apply a transform operation to the data representative of the residual block, such a transform operation belonging to a set of transform operations which is stored beforehand in association with the determined mode of prediction,
  reconstruct the current block with the aid of a predictor block obtained on completion of the prediction and of the data obtained subsequent to the transform operation.

The decoding device according to the invention is noteworthy in that the processing circuit is designed to store the set of transform operations which is associated with the determined mode of prediction, the number of transform operations contained in this set being different from the number of transform operations contained in a set of transform operations which is stored in association with at least one other predetermined mode of prediction of the plurality of predetermined modes of prediction.

Such a decoding device is in particular able to implement the aforementioned decoding method.

The invention further relates to a computer program comprising instructions for implementing one of the coding and decoding methods according to the invention, when it is executed on a computer.

This program can use any programming language, and be in the form of source code, object code, or of code intermediate between source code and object code, such as in a partially compiled form, or in any other desirable form.

The invention also envisages a recording medium readable by a computer on which a computer program is recorded, this program comprising instructions suitable for the implementation of one of the coding or decoding methods according to the invention, such as described hereinabove.

The invention also envisages a recording medium readable by a computer on which a computer program is recorded, this program comprising instructions suitable for the implementation of the coding or decoding method according to the invention, such as described hereinabove.

The recording medium can be any entity or device capable of storing the program. For example, the medium can comprise a storage means, such as a ROM, for example a CD ROM or a microelectronic circuit ROM, or else a magnetic recording means, for example a USB key or a hard disk.

Moreover, the recording medium can be a transmissible medium such as an electrical or optical signal, which can be conveyed via an electrical or optical cable, by radio or by other means. The program according to the invention can in particular be downloaded from a network of Internet type.

Alternatively, the recording medium can be an integrated circuit in which the program is incorporated, the circuit being adapted to execute or to be used in the execution of the aforementioned coding or decoding method.

BRIEF DESCRIPTION OF THE DRAWINGS

Other characteristics and advantages will become apparent on reading a preferred embodiment described with reference to the figures in which:

FIG. 4 represents a table illustrating the number of transforms which is determined per mode of prediction, after successive addition of sixteen transforms according to the method of determination of FIG. 3, FIG. 8 represents an exemplary grouping of various modes of Inter prediction as a function of the symmetry of their corresponding angles, FIG. 9 represents a table illustrating the number of transforms which is determined per group of modes of prediction, after successive addition of sixteen transforms according to a variant of the method of determination of FIG. 3.

DETAILED DESCRIPTION OF THE CODING PART

An embodiment of the invention will now be described, in which the coding method according to the invention is used to code an image or a sequence of images according to a binary stream close to that obtained by a coding compliant with any one of the current or forthcoming video coding standards.

Figure 1:
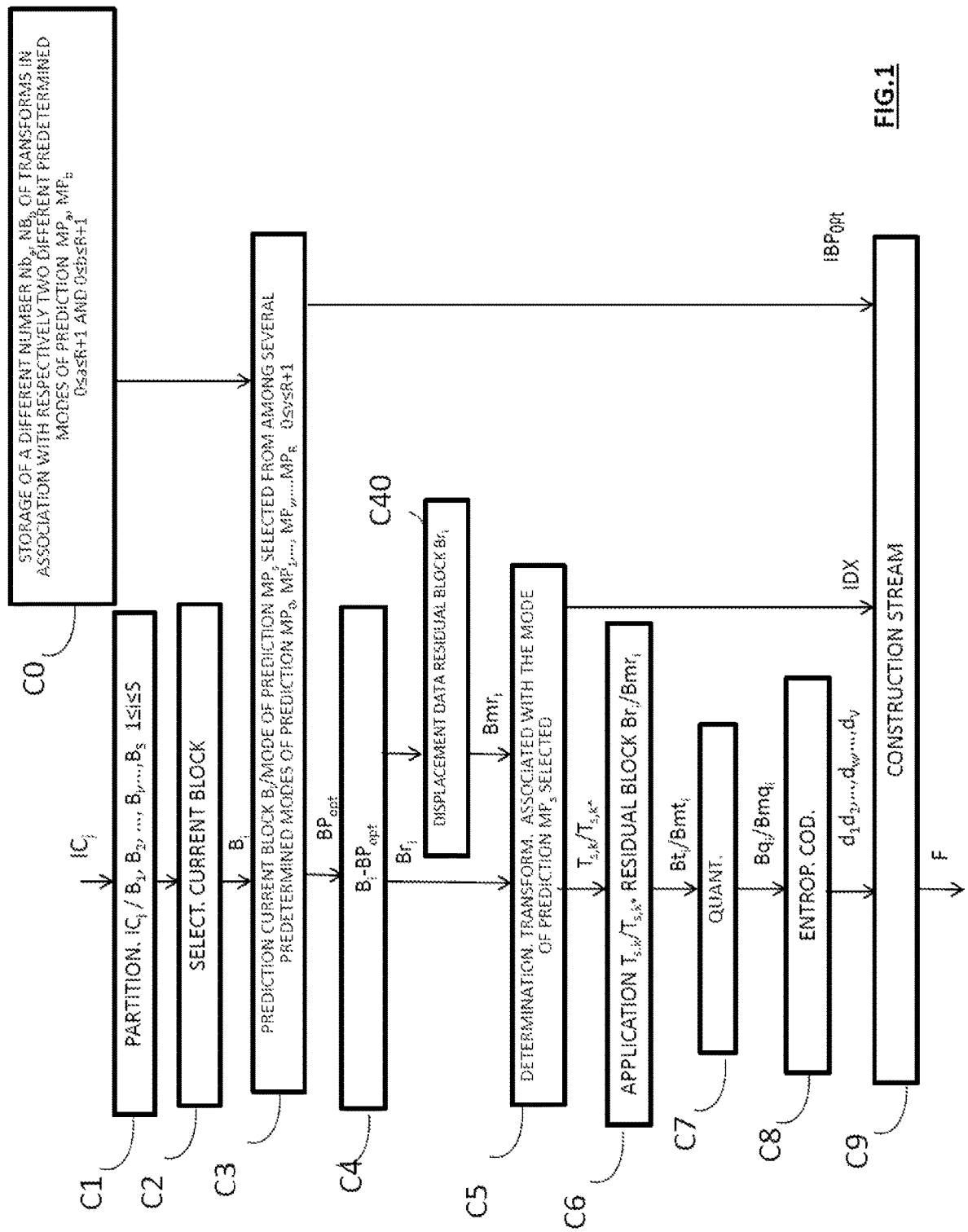
FIG. 1 represents the steps of the coding method according to the invention.

In this embodiment, the coding method according to the invention is for example implemented in a software or hardware manner by modifications of a coder initially compliant with any one of the current or forthcoming video coding standards. The coding method according to the invention is represented in the form of an algorithm comprising steps C0 to C9 such as represented in FIG. 1.

Figure 2:
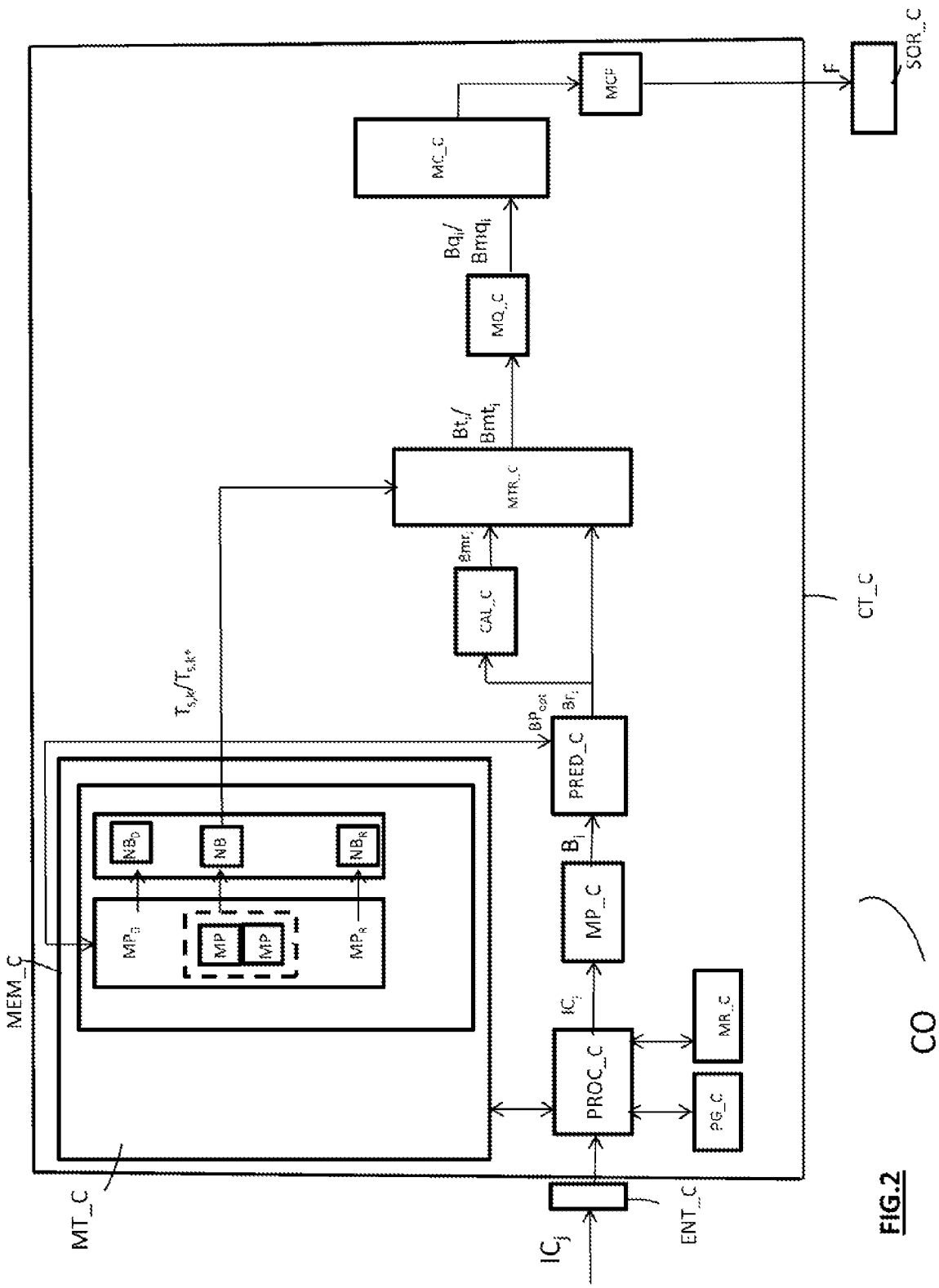
FIG. 2 represents an embodiment of a coding device according to the invention.

According to the embodiment of the invention, the coding method according to the invention is implemented in a coding device C0 represented in FIG. 2.

As illustrated in FIG. 2, such a coder device comprises:
- an input ENT_C for receiving a current image to be coded,
- a processing circuit CT_C for implementing the coding method according to the invention, the processing circuit CT_C containing:
  - a memory MEM_C comprising a buffer memory MT_C,
  - a processor PROC_C driven by a computer program PG_C,
- an output SOR_C for delivering a coded stream containing the data obtained on completion of the coding of the current image.

On initialization, the code instructions of the computer program PG_C are for example loaded into a RAM memory, MR_C, before being executed by the processing circuit CT_C.

The coding method represented in FIG. 1 applies to any current image $IC_j$ which is a still or else which forms part of a sequence of L images $IC_1, \ldots, IC_j, \ldots, IC_L$ ($1 \leq j \leq L$) to be coded.

In the course of a step C1 represented in FIG. 1, there is undertaken, in a manner known per se, the partitioning of a current image $IC_j$ into a plurality of blocks $B_1, B_2, \ldots, B_i, \ldots, B_S$ ($1 \leq i \leq S$), for example of size M×M pixels, where M is a natural integer greater than or equal to 1. Such a partitioning step is implemented by a partitioning software module MP_C represented in FIG. 2, which module is driven by the processor PROC_C.

It should be noted that within the meaning of the invention, the term "block" signifies coding unit. The latter terminology is in particular used in the HEVC standard "ISO/IEC/23008-2 Recommendation ITU-T H.265 High Efficiency Video Coding (HEVC)".

In particular, such a coding unit groups together sets of pixels of rectangular or square shape, also called blocks, macroblocks, or else sets of pixels exhibiting other geometric shapes.

Said blocks $B_1, B_2, \ldots, B_i, \ldots, B_S$ are intended to be coded according to a predetermined order of traversal, which is for example of the lexicographic type. This signifies that the blocks are coded one after another, from left to right.

Other types of traversal are of course possible. Thus, it is possible to split the image $IC_j$ into several sub-images called slices and to apply a splitting of this type to each sub-image independently. It is also possible to code not a succession of lines, as explained hereinabove, but a succession of columns. It is also possible to traverse the lines or columns in either direction.

Moreover, each block can itself be divided into sub-blocks which are themselves subdivisible.

In the course of a step C2 represented in FIG. 1, the coder C0 selects as current block a first block to be coded $B_i$ of the image $IC_j$, such as for example the first block $B_1$.

In the course of a step C3 represented in FIG. 1, there is undertaken the prediction of the current block $B_i$ by known techniques of Intra and/or Inter prediction. For this purpose, the block $B_i$ is predicted with respect to at least one predictor block in accordance with a mode of prediction $MP_s$ selected from among a plurality of predetermined modes of prediction $MP_0, MP_1, \ldots, MP_v, \ldots, MP_R$ where $0 \le v \le R+1$ and $0 \le s \le R+1$.

In a manner known per se, the block $B_i$ is predicted with respect to a plurality of candidate predictor blocks. Each of the candidate predictor blocks is a block of pixels which has been already coded or indeed coded and then decoded. Such predictor blocks are stored beforehand in the buffer memory MT_C, such as represented in FIG. 2, of the coder C0.

On completion of the prediction step C3, an optimal predictor block $BP_{opt}$ is obtained subsequent to setting said predetermined modes of prediction into competition, for example by minimizing a distortion bitrate criterion well known to the person skilled in the art. The block $BP_{opt}$ is considered to be an approximation of the current block $B_i$. The information relating to this prediction is intended to be written into a data signal or stream to be transmitted to a decoder. Such information comprises in particular the type of prediction (Inter or Intra), and if relevant, the selected mode of prediction $MP_s$, the type of partitioning of the current block if the latter has been subdivided, the reference image index and the displacement vector used in the case where an Inter prediction mode has been selected. This information is compressed by the coder C0.

In the course of a step C4 represented in FIG. 1, there is undertaken the comparison of the data relating to the current block $B_i$ with the data of the predictor block $BP_{opt}$. More precisely, in the course of this step, there is conventionally undertaken the calculation of the difference between the predictor block obtained $BP_{opt}$ and the current block $B_i$.

A data set, called a residual block $Br_i$, is then obtained on completion of step C4.

Steps C3 and C4 are implemented by a predictive coding software module PRED_C represented in FIG. 2, which module is driven by the processor PROC_C.

In the course of a step C51 represented in FIG. 1, the coder C0 of FIG. 2 undertakes the determination of a transform of the residual block $Br_i$.

Such a transform may be for example:
  a direct transform such as for example a discrete cosine transform of DCT type,
  a direct transform such as for example a discrete sine transform of DST type,
  a block transform optimized in terms of distortion bitrate as presented in the publication "Rate-distortion optimised transform competition for intra coding in HEVC", Adria Arrufat, Pierrick Philippe, Olivier Déforges, IEEE VCIP, December 2014,
  a wavelet transform of the DWT type,
  a transform including an overlap of the Lapped Transforms type such as presented in the publication "Reduction of blocking effects in image coding with a lapped orthogonal transform", H. Malvar,
  or utilizable transforms of any other type.

Said transform belongs to a set of transforms which, in the course of a prior storage step C0 represented in FIG. 1, is stored in association with the selected mode of prediction $MP_s$, in the buffer memory MT_C of FIG. 2. In the course of this storage step:
  the predetermined mode of prediction $MP_0$ is stored in association with a set of transforms containing a number $NB_0$ of transforms,
  the predetermined mode of prediction $MP_1$ is stored in association with a set of transforms containing a number $NB_1$ of transforms,
  . . .
  the predetermined mode of prediction $MP_v$ is stored in association with a set of transforms containing a number $NB_v$ of transforms,
  . . .
  the predetermined mode of prediction $MP_R$ is stored in association with a set of transforms containing a number $NB_R$ of transforms.

In accordance with the invention, for at least two different modes of prediction $MP_a$, $MP_b$ belonging to the plurality of predetermined modes of prediction $MP_0, MP_1, \ldots, MP_v, \ldots, MP_R$, with $0 \le a \le R+1$ and $0 \le b \le R+1$, the number of transforms, denoted $NB_a$, which is contained in the set of transforms which is associated with the mode of prediction $MP_a$ is different from the number of transforms, denoted $NB_b$, which is contained in a set of transforms which is stored in association with the mode of prediction $MP_b$.

According to a first exemplary embodiment, for at least two sets of transforms stored respectively in association with two modes of prediction of said plurality $MP_0, MP_1, \ldots, MP_v, \ldots, MP_R$ of predetermined modes of prediction, the number of transforms in each of said two sets contains in common at least one identical transform operation.

For example, in the case of a coding according to the HEVC standard, the number of transforms in each of said two sets may for example contain in common:
  a transform of DST type or else a transform of DCT type,
  two transforms, one of DCT type, the other of DST type,
  more than two transforms in common.

Moreover, more than two sets of transforms can contain in common at least one identical transform operation. Still in the case of a coding according to the HEVC standard, and more particularly in the case of an Intra prediction compliant with this standard which proposes thirty-five possible directions of prediction $DPI_0, DPI_1, \ldots, DPI_{34}$, the sets of transforms which are associated respectively with each of these thirty-five directions of prediction can contain in common at least one identical transform operation.

According to a second exemplary embodiment represented in FIG. 2, the set of transforms which is associated with said selected mode of prediction $MP_s$ and containing a number $NB_s$ of transforms is stored in association with at least one other mode of prediction, denoted $MP_u$, of said plurality of predetermined modes of prediction $MP_0$, $MP_1, \ldots, MP_v, \ldots, MP_R$, with $0 \leq u \leq R+1$.

Thus, as a function of the number $NB_s$ of transforms which is contained in the set of transforms which is associated with the mode of prediction $MP_s$ selected in step C4, the aforementioned determination step C5 consists:
- either in reading a single transform, denoted $T_{s,k}$, if the set of transforms which is associated with the mode of prediction $MP_s$ contains only one transform, that is to say in the case where $NB_s=1$,
- or in selecting one transform, denoted for example $T_{s,k*}$, with $0 \leq k* \leq N-1$, from among several if the set of transforms which is associated with the mode of prediction $MP_s$ contains more than one transform, that is to say in the case where $NB_s>1$, such a selection being implemented according to a predetermined coding performance criterion, for example:
- by minimizing the bitrate/distortion criterion well known to the person skilled in the art,
- or by minimizing just the bitrate,
- or by minimizing just the distortion,
- or by minimizing the bitrate distortion/complexity compromise well known to the person skilled in the art,
- or by minimizing just the efficiency,
- or by minimizing just the complexity.

It is recalled that in a video coding context, the complexity is defined for example by the count of the number of mathematical operations (addition, multiplication, binary shift) involved in the calculation of the transform of the coefficients of the residual block.

In the course of a step C6 represented in FIG. 1, there is undertaken the transform of the residual block $Br_i$ with the aid of the transform $T_{s,k}$ or $T_{s,k*}$. Such an operation is performed by a transform software module MTR_C, such as represented in FIG. 2, which module is driven by the processor PROC_C. On completion of step C6, a transformed block $Bt_i$ is obtained.

In the course of a step C7 represented in FIG. 1, there is undertaken the quantization of the data of the transformed block $Bt_i$ according to a conventional quantization operation, such as for example a scalar or vector quantization. A block $Bq_i$ of quantized coefficients is then obtained. Step C7 is performed by means of a quantization software module MQ_C such as represented in FIG. 2, which module is driven by the processor PROC_C.

In FIG. 1, the quantization step C7 is represented subsequent to the transform application step C6. However, step C7 can be integrated into step C6 which is then implemented with integer numbers including the quantization factor.

In a manner known per se, in the course of a step C8 represented in FIG. 1, there is undertaken the coding of the data of the block $Bq_i$. Such a coding is for example an entropy coding of CABAC ("Context Adaptive Binary Arithmetic Coder") type or else an entropy coding of arithmetical or Huffman type. Coded data $d_1, d_2, \ldots, d_w, \ldots, d_v$ ($1 \leq w \leq V$ with V a natural integer) associated with the current block $B_i$ are obtained on completion of step C8.

Step C8 is implemented by a coding software module MC_C represented in FIG. 2, which module is driven by the processor PROC_C.

In the course of a step C9 represented in FIG. 1, there is undertaken the construction of the data signal or stream F which contains:
- the coded data $d_1, d_2, \ldots, d_w, \ldots, d_v$ obtained on completion of the aforementioned step C8,
- the index IDX of the transform $T_{s,k}$ or $T_{s,k*}$ which was determined in step C5.

The index IDX can be written into the stream, for example in the form of a binary code. Such an arrangement is for example implemented if the transform $T_{s,k}$ or $T_{s,k*}$ is a transform which is common to the R+1 sets of transforms which are associated respectively with the R+1 predetermined modes of prediction $MP_0, MP_1, \ldots, MP_v, \ldots, MP_R$. The index IDX will then be set to 1 or 0, for example 1. If on the other hand the transform $T_{s,k}$ or $T_{s,k*}$ is a transform which is not common to the R+1 sets of transforms which are associated respectively with the R+1 predetermined modes of prediction $MP_0, MP_1, \ldots, MP_v, \ldots, MP_R$, the index IDX will contain a first bit of value 0, followed by an additional code word representative of the transform $T_{s,k}$ or $T_{s,k*}$ which was selected from the number $NB_s$ of transforms contained in the set of transforms which is associated with the mode of prediction $MP_s$ selected. The first bit of value 0 is for example coded with the aid of a CABAC coder. The additional code word can be coded on a fixed length if the number of transforms $NB_s$ is a power of 2. The additional code word can also be coded on a variable-length code if the number of transforms $NB_s$ is a power of 2, or not.

Step C9 is implemented by a data signal construction software module MCF, such as represented in FIG. 2, which module is driven by the processor PROC_C.

The data signal F is thereafter delivered via the output SOR_C of the coder C0 of FIG. 2, and then transmitted by a communication network (not represented) to a remote terminal. The latter comprises the decoder D0 represented in FIG. 10.

In a manner known per se, the data signal F furthermore comprises certain information encoded by the coder C0, such as the type of prediction (Inter or Intra) applied in step C3, and if relevant, the mode of prediction selected, the index of the predictor block obtained $BP_{opt}$ obtained on completion of step C3, denoted $IBP_{opt}$, the type of partitioning of the current block $B_i$ if the latter has been partitioned, the reference image index and the motion vector that are used in the Inter prediction mode.

Thereafter, the decoding of the residual block $Br_i$ is undertaken. A decoded residual block $BDr_i$ is then obtained. The construction of the decoded block $BD_i$ is then undertaken by adding the decoded residual block $BDr_i$ to the optimal predictor block $BP_{opt}$.

It should be noted that the decoded block $BD_i$ is the same as the decoded block obtained on completion of the method of decoding the image $IC_j$, which will be described later in the description. The decoded block $BD_i$ is thus rendered available to be used by the coder C0 of FIG. 2.

The coding steps C1 to C9 which have just been described hereinabove are thereafter implemented for each of the blocks $B_1, B_2, \ldots, B_i, \ldots, B_S$ to be coded of the current image $IC_j$ considered, in a predetermined order which is for example lexicographic order.

A method for determining the number of transforms for each predetermined mode of prediction will now be described, with reference to FIGS. 3 to 8, according to a first embodiment of the invention, in the case of an HEVC coding of Intra type.

Figure 3:
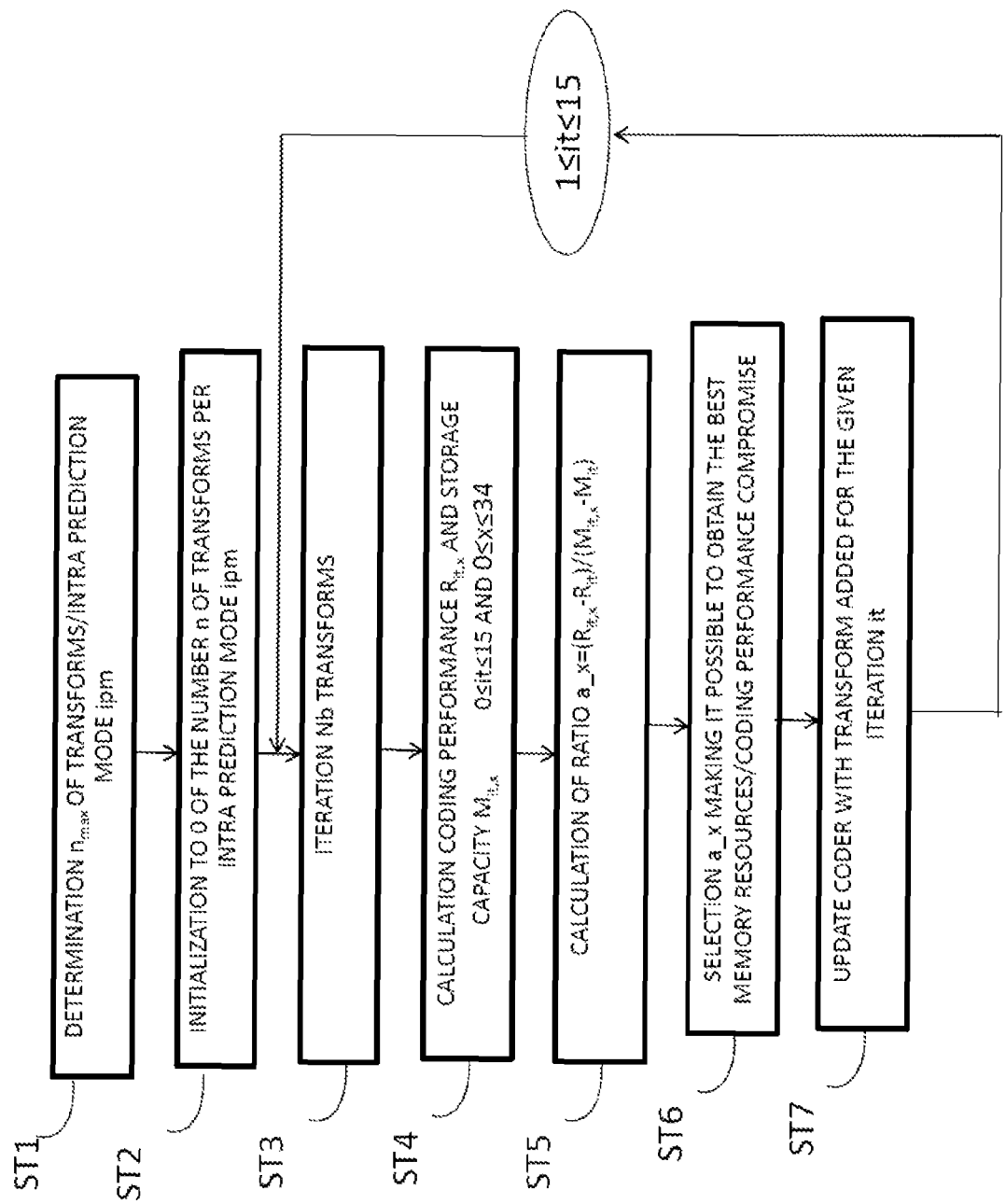
FIG. 3 represents the steps of a method for determining a variable number of transforms per mode of prediction, according to one embodiment of the invention.

Prior to the implementation of the steps of the coding method of FIG. 1, the following steps are undertaken:

In the course of a step ST1 represented in FIG. 3, there is determined a maximum number $n_{max}$ of transforms that is liable to be associated with a given mode of intra prediction.

In the embodiment represented, $n_{max}=16$, this number being able to include or not include at least one HEVC transform common to each of the 35 modes of intra prediction ipm of the HEVC standard.

In the course of a step ST2 represented in FIG. 3, there is undertaken an initialization to zero of the number of transforms for each of the thirty-five modes of intra prediction ipm of the HEVC standard. Each mode of prediction has in this step only a single common transform of the type of that of HEVC (DCT or DST) and zero additional transforms. Such a step is summarized in table TB1 of FIG. 4, whose first column lists the 35 modes of intra prediction $ipm_0$ to $ipm_{34}$ and whose first row lists the first fifteen iterations (iter) in the course of each of which a transform is added.

Following the first column of table TB1 are also listed, for each of the first fifteen iterations (iter):
the mode of prediction (ipm) selected according to the best memory resources/coding performance compromise, subsequent to the addition of a given transform,
the entire number (Nb) of transforms added since the first iteration (iter),
the storage capacity (ROM) used at the coder to store the entirety of the transforms added,
the coding performance (BDRate) obtained, that is to say the percentage bitrate reduction obtained relative to an HEVC coder.

In table TB1, the initialization to zero is represented with iter=0.

In the course of a step ST3 represented in FIG. 3, there is undertaken a first iteration iter=1, in the course of which a first transform is added.

In the course of a step ST4 represented in FIG. 3, there is undertaken, for each of the thirty-five modes of intra prediction, the calculation of the coding performance and of the storage capacity to be used with regard to the added transform.

For a given mode of intra prediction $ipm_x$, with $0 \leq x \leq 34$, and a given iteration it, with $it \geq 0$, the coding performance obtained, that is to say the bitrate gain, is denoted $R_{it,x}$ and the corresponding storage capacity for storing the added transform is denoted $M_{it,x}$.

In the course of a step ST5 represented in FIG. 3, there is undertaken, for each of the thirty-five modes of intra prediction, the calculation of the ratio a_x between the bitrate disparity obtained and the added memory disparity, such that:
$a\_x = (R_{it,x} - R_0)/(M_{it,x} - M_0)$ with $R_0$ and $M_0$ presenting respectively the bitrate saved and the memory added with respect to the HEVC standard, that is to say at the iteration it=0. ($R_0=0$, $M_0=0$).

In the course of a step ST6 represented in FIG. 3, there is undertaken the selection of the mode of intra prediction $ipm_x$ for which the ratio a_x exhibits the most favorable value, that is to say the biggest bitrate decrease for the least possible added memory resources.

Figure 4:
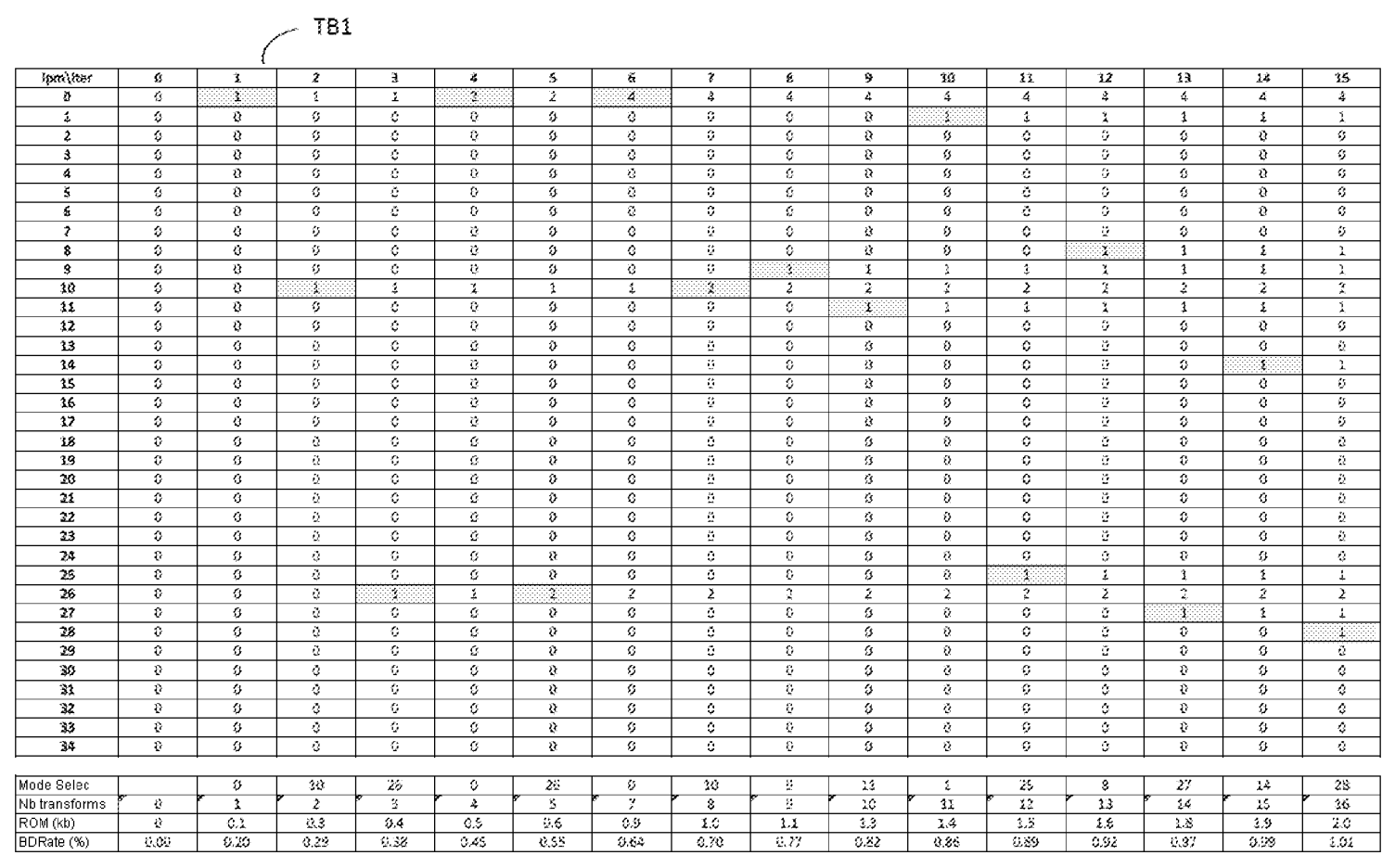

As represented in the third column of table TB1 of FIG. 4, for the first iteration it=1, it is the value of the ratio a_0 which is the most favorable and which corresponds to the mode of intra prediction 0. The index of this mode is indicated at the bottom of the third column of the table in association with:
the bitrate $R_1$ saved with respect to the HEVC standard, i.e. $R_1=0.2\%$,
the memory $M_1$ added with respect to the HEVC standard, i.e. $M_1=0.1$ kb.

In the course of a step ST7 represented in FIG. 3, there is undertaken an updating of the coder C0 of FIG. 2 with the transform added during this first iteration.

Steps ST3 to ST7 are thereafter applied again for each iteration.

As illustrated in FIG. 4, table TB1 presents how, over the first fifteen iterations performed, the bitrate gain (BDRate) is improved as a function of the iterations, as the memory resources (ROM) increase.

Thus for example, at iteration iter=15, as represented in the last column of table TB1, it is the value of the ratio a_28 which is the most favorable and which corresponds to the mode of intra prediction 28. The index of this mode is indicated at the bottom of the last column of the table in association with:
the bitrate $R_{15}$ saved with respect to the HEVC standard, i.e. $R_{15}=1.01\%$,
the memory $M_{15}$ added with respect to the HEVC standard, i.e. $M_{15}=2$ kb.

Moreover, at iteration iter=15 is represented the number of transforms which have been added per mode of prediction. Thus:
for the mode of intra prediction 0, four transforms have been added,
for the modes of intra prediction 10 and 16, two transforms have been respectively added,
for the modes of intra prediction 1, 8, 9, 11, 14, 25, 27 and 28, one transform has been respectively added.

For iteration iter=15, a total of sixteen transforms has therefore been added.

Figure 5:
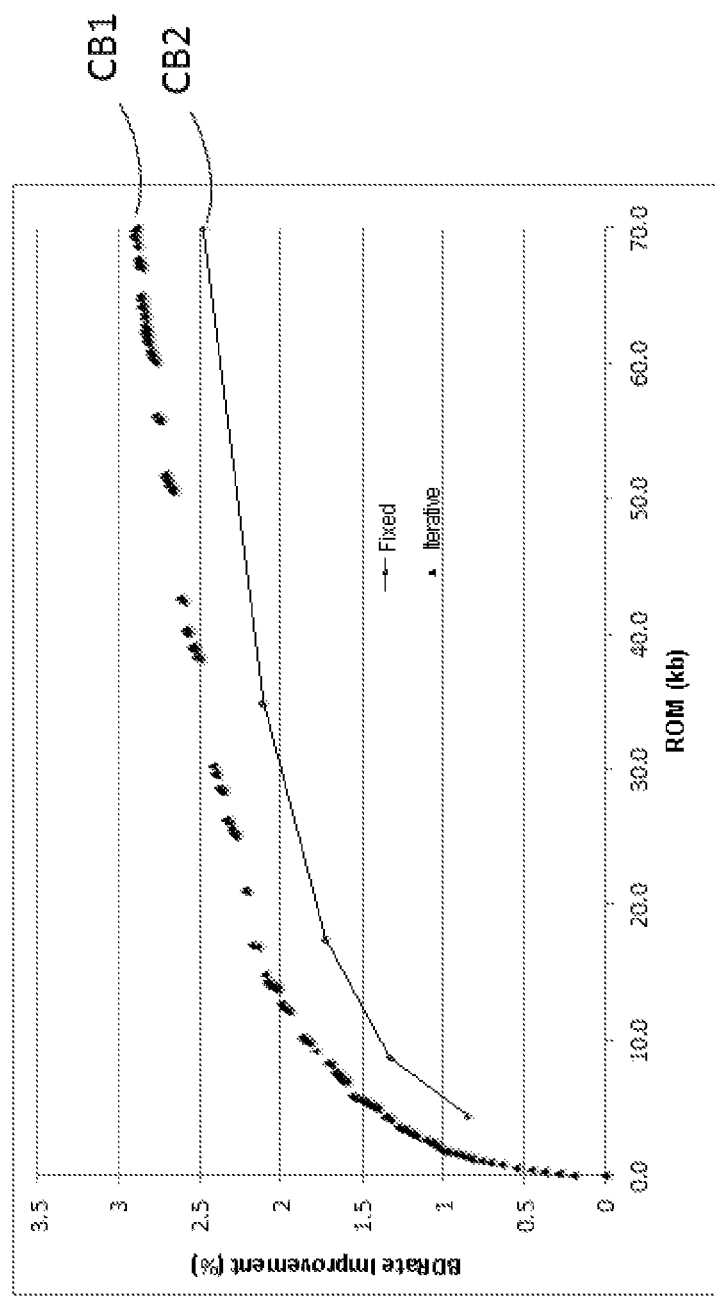
FIG. 5 represents a comparative chart comparing the memory resources/coding performance compromise such as obtained subsequent to the implementation of the iterative method of FIG. 3, and that obtained with an identical number of transforms per mode of prediction.

With reference now to FIG. 5 is presented:
directly in conjunction with table TB1 of FIG. 4, a dotted curve CB1, representative of the evolution of the coding performance with respect to the memory resources used, subsequent to the implementation of the iterative method of FIG. 3,
a solid curve CB2, representative of the evolution of the coding performance with respect to the memory resources used, such as obtained with a coder of the state of the art which uses an identical number of transforms per mode of prediction.

By comparing the two curves CB1 and CB2, it is noted that the coding performance, for a given memory footprint, is considerably improved when the iterative method for determining the number of transforms per mode of prediction, such as represented in FIG. 3, is implemented. Correspondingly, the iterative method for determining the number of transforms per mode of prediction, such as represented in FIG. 3, makes it possible to obtain a significant reduction in the memory resources required to store the transforms determined, for envisaged coding performance.

In order to assess the gain afforded, according to the invention, in terms of storage capacity, for envisaged coding performance, is presented the table hereinbelow which gives a comparative overview of the fixed and variable storage capacities, and of the storage capacity reduction obtained with the variable storage capacities used according to the invention.

| Bitrate gain (BDRate) (%) | Fixed storage capacity (kb) | Variable storage capacity (kb) | Storage capacity reduction (%) |
|---|---|---|---|
| 0.8 | 4.4 | 1.3 | 71 |
| 1.3 | 8.8 | 4.1 | 53 |
| 1.7 | 17.5 | 8.3 | 53 |
| 2.1 | 35 | 14.9 | 58 |
| 2.5 | 70 | 30.3 | 57 |
| 2.8 | 140 | 60.4 | 57 |

Thus, for an envisaged bitrate gain of 2.8%, the storage capacity of the coders of the prior art which use a fixed number of transforms per mode of prediction is 140 kb, whilst the storage capacity of the coders according to the invention which use a variable number of transforms per mode of prediction is 60.4 kb. The reduction in the storage capacities of the coders according to the invention with respect to the coders of the state of the art can thus be estimated at 57% for the envisaged bitrate gain of 2.8%.

Consequently, the coding method according to the invention advantageously makes it possible to obtain high coding performance, with a limited impact on the storage capacity with respect to the transforms relative to that used in the coding methods of the prior art.

An embodiment of the invention implemented in the case of an HEVC coding of Intra type, and in which the set of transforms which is associated with a mode of intra prediction selected in the course of step C3 of FIG. 1 is stored beforehand in association with at least one other mode of prediction of said plurality of predetermined modes of prediction, will now be described with reference to FIGS. 1 to 3, 6A, 6B, 7 to 9.

In this example, on completion of step C3 of FIG. 1, the optimal predictor block $BP_{opt}$ obtained is associated with an optimal direction of Intra prediction which is for example the direction $DPI_{22}$.

In accordance with the present embodiment, the transform (if unique) or the set of transforms which is(are) associated with the direction of Intra prediction $DPI_{22}$ is associated beforehand, in the course of step C0 of FIG. 1, with another direction of Intra prediction, on condition that this other direction of Intra prediction is symmetric with respect to the direction of Intra prediction $DPI_{22}$. In this manner, half as many transforms are stored at the level of the coder C0, and correspondingly, at the level of the decoder which will be described later on in the description, the advantage being a reduction in the memory on the coder and decoder side.

According to a first variant, two directions of Intra prediction exhibiting symmetries are associated with the same transform or with the same set of transforms.

According to a second variant, two angular directions of Intra prediction each exhibiting identical disparities of angles with respect to a vertical (or horizontal) direction are associated with the same transform or with the same set of transforms.

Figure 6A:
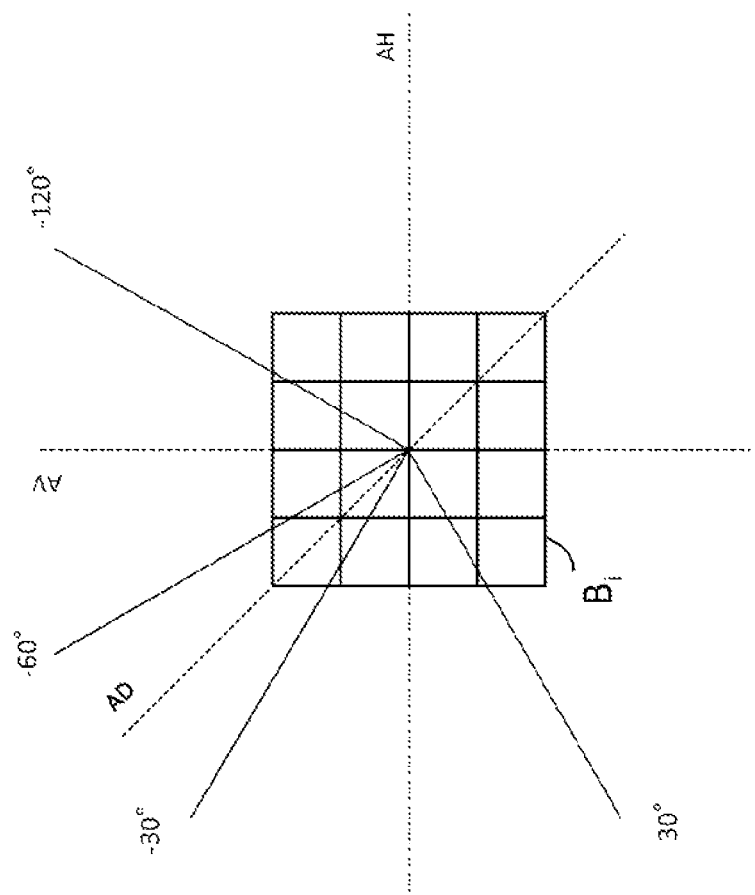
FIG. 6A represents a first exemplary grouping of various modes of Intra prediction as a function of the symmetry of their corresponding angles.
Figure 7:
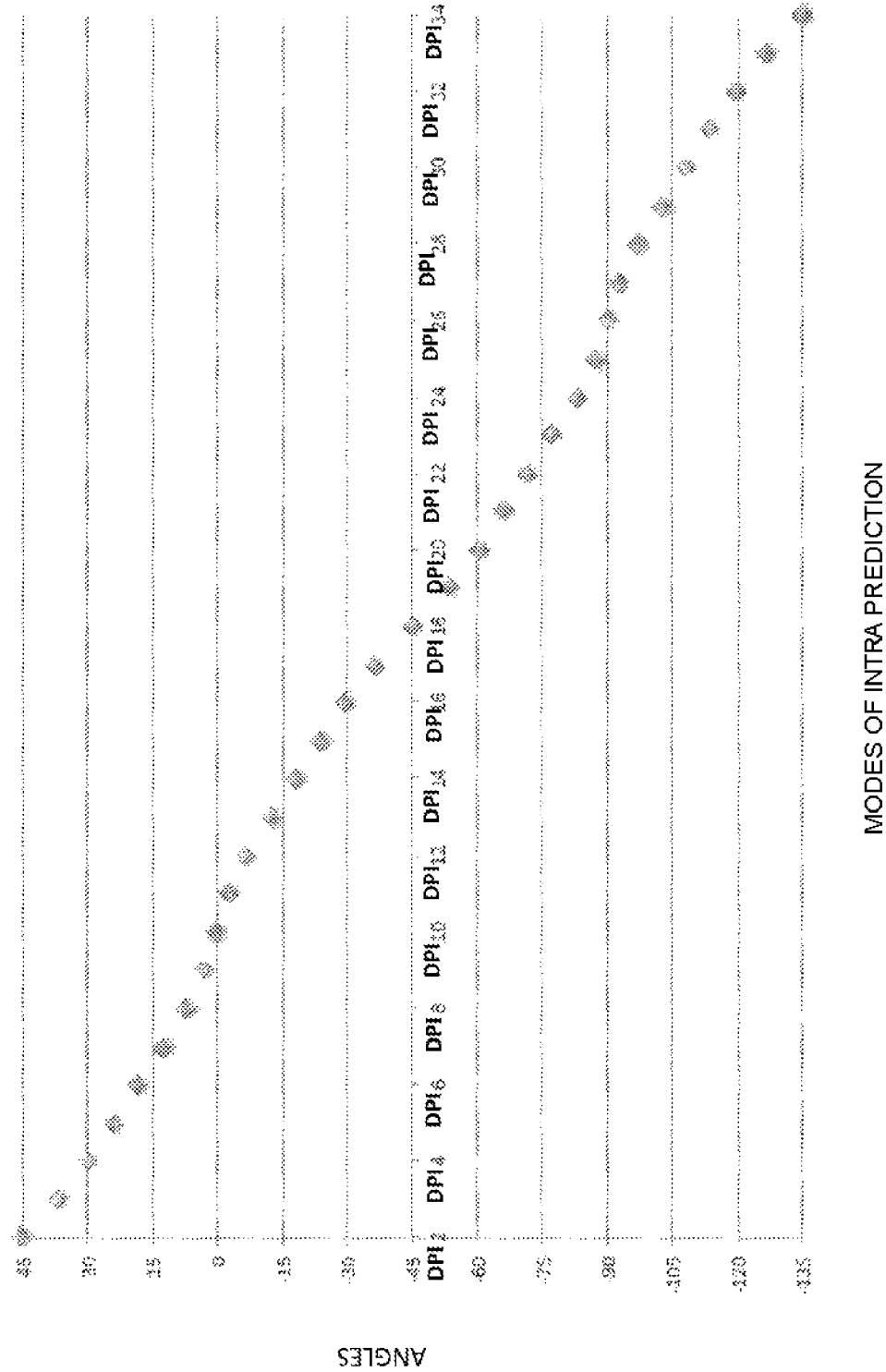
FIG. 7 represents a graph which illustrates the relation between thirty-three modes of HEVC Intra prediction and their corresponding angular directions.

Thus, as represented in FIG. 6A, an angular direction of Intra prediction exhibiting an angle of 30° with respect to a horizontal axis AH is associated with an angular direction of Intra prediction exhibiting symmetrically an angle of –30° with respect to this horizontal axis. With reference to FIG. 7, these two directions of Intra prediction correspond respectively to the directions $DPI_4$ and $DPI_{16}$.

Similarly, as represented in FIG. 6A, an angular direction of Intra prediction exhibiting an angle of –60° with respect to a horizontal axis is associated with an angular direction of Intra prediction exhibiting symmetrically an angle of –120° with respect to a vertical axis AV. With reference to FIG. 7, these two directions of Intra prediction correspond respectively to the directions $DPI_{20}$ and $DPI_{32}$.

Still in accordance with the example which has just been described and according to yet another embodiment, the transform or the plurality of transforms which is(are) associated with the direction of Intra prediction $DPI_{22}$ selected in step C3 is associated beforehand with three other directions of Intra prediction, on condition that these other directions of Intra prediction are symmetric with respect to the direction of Intra prediction $DPI_{22}$. In this manner, a quarter as many transforms are stored at the level of the coder C0, and correspondingly, at the level of the decoder which will be described later on in the description, the advantage being a reduction in the memory on the coder and decoder side.

According to a first variant, four directions of Intra prediction exhibiting symmetries are associated with the same transform or with the same set of transforms.

According to a second variant, four angular directions of Intra prediction each exhibiting identical angles with respect to a vertical, horizontal and diagonal axis are associated with the same transform or with the same set of transforms.

Thus, as represented in FIG. 6A, an angular direction of Intra prediction exhibiting an angle of 30° with respect to the horizontal axis AH is associated:
- with an angular direction of Intra prediction of an angle of –30° by symmetry with respect to this horizontal axis,
- with an angular direction of Intra prediction exhibiting an angle of –60° by symmetry with respect to this horizontal axis and then with respect to a diagonal axis AD,
- with an angular direction of Intra prediction exhibiting an angle of –120° by symmetry with respect to the diagonal axis AD.

With reference to FIG. 7, these four directions of Intra prediction correspond respectively to the directions $DPI_4$, $DPI_{16}$, $DPI_{20}$ and $DPI_{32}$.

The table hereinbelow represents nine groups $G_1$ to $G_9$ of directions of HEVC Intra prediction, with which groups can be associated, in the buffer memory MT_C of the coder C0 of FIG. 2, one and the same transform (if unique) or else a set of transforms, such as determined according to the invention.

| Group | Index of directions of Intra prediction | | | |
|---|---|---|---|---|
| $G_1$ | 2 | 34 | 18 | |
| $G_2$ | 3 | 33 | 19 | 17 |
| $G_3$ | 4 | 32 | 20 | 16 |
| $G_4$ | 5 | 31 | 21 | 15 |
| $G_5$ | 6 | 30 | 22 | 14 |
| $G_6$ | 7 | 29 | 23 | 13 |
| $G_7$ | 8 | 28 | 24 | 12 |
| $G_8$ | 9 | 27 | 25 | 11 |
| $G_9$ | 10 | | 26 | |

Figure 6B:
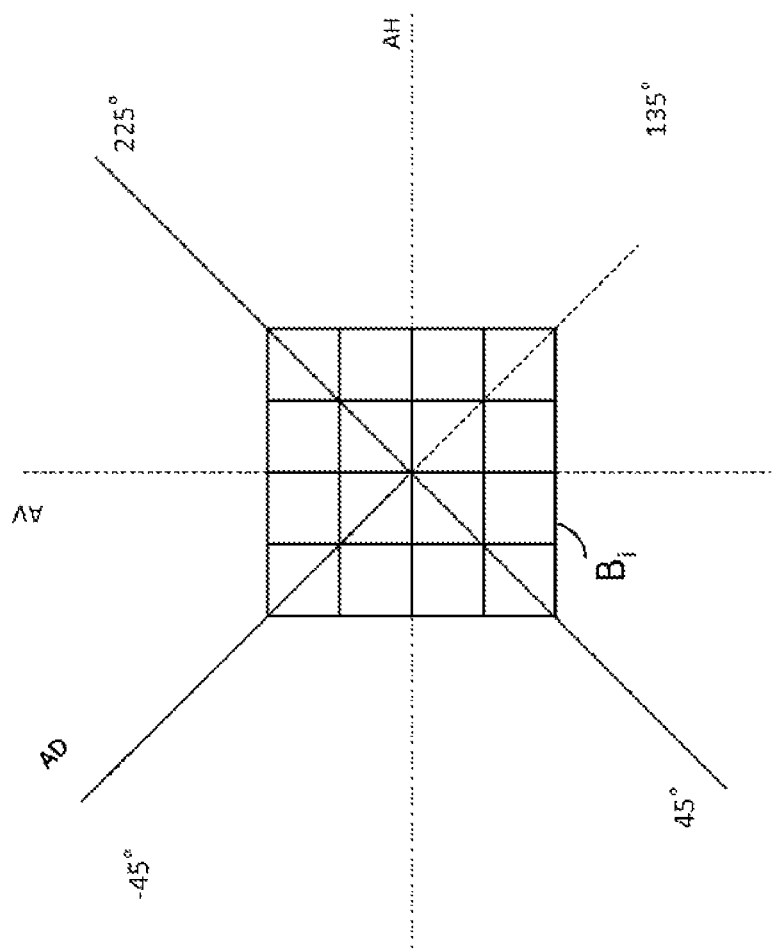
FIG. 6B represents a second exemplary grouping of various modes of Intra prediction as a function of the symmetry of their corresponding angles.

The angular directions at multiples of 45° (45°, –45° and –135°) such as represented in FIG. 6B, corresponding respectively to the directions of prediction $DPI_2$, $DPI_{18}$ and $DPI_{34}$, as illustrated in FIG. 7, are grouped together in threes and are associated with one and the same transform or with one and the same set of transforms.

In accordance with the obtaining of the aforementioned groups of modes of prediction, with reference to FIG. 1, it may be necessary to undertake, prior to step C5 of determining a transform, a step C40 of at least one displacement of the data of the residual block Br; such as obtained on completion of step C4 of FIG. 1. In the course of step C40, each datum considered is displaced inside the residual block while preserving its closest neighbors.

Step C40 is implemented by a calculation software module CAL_C such as represented in FIG. 2, which module is driven by the processor PROC_C.

According to a first embodiment, a type of data displacement is a transposition, namely an exchange of the row and column coordinates of a datum of the current residual block.

According to a second embodiment, a type of data displacement is a mirror, namely an exchange of the columns or rows of the current residual block. Each datum considered in the current residual block Br; is thus displaced inside the residual block while preserving its closest neighbors.

According to a third embodiment, a type of data displacement is a combination of the transposition and of the mirror, that is to say:
- either the application of a displacement of transposition type followed by the application of a displacement of mirror type to the data of the current residual block,
- or the application of a displacement of mirror type followed by the application of a displacement of transposition type to the data of the current residual block.

Furthermore, according to another embodiment of the invention, the type of data displacement in the residual block Br; is dependent on the mode of prediction $MP_s$ selected.

Figure 8:
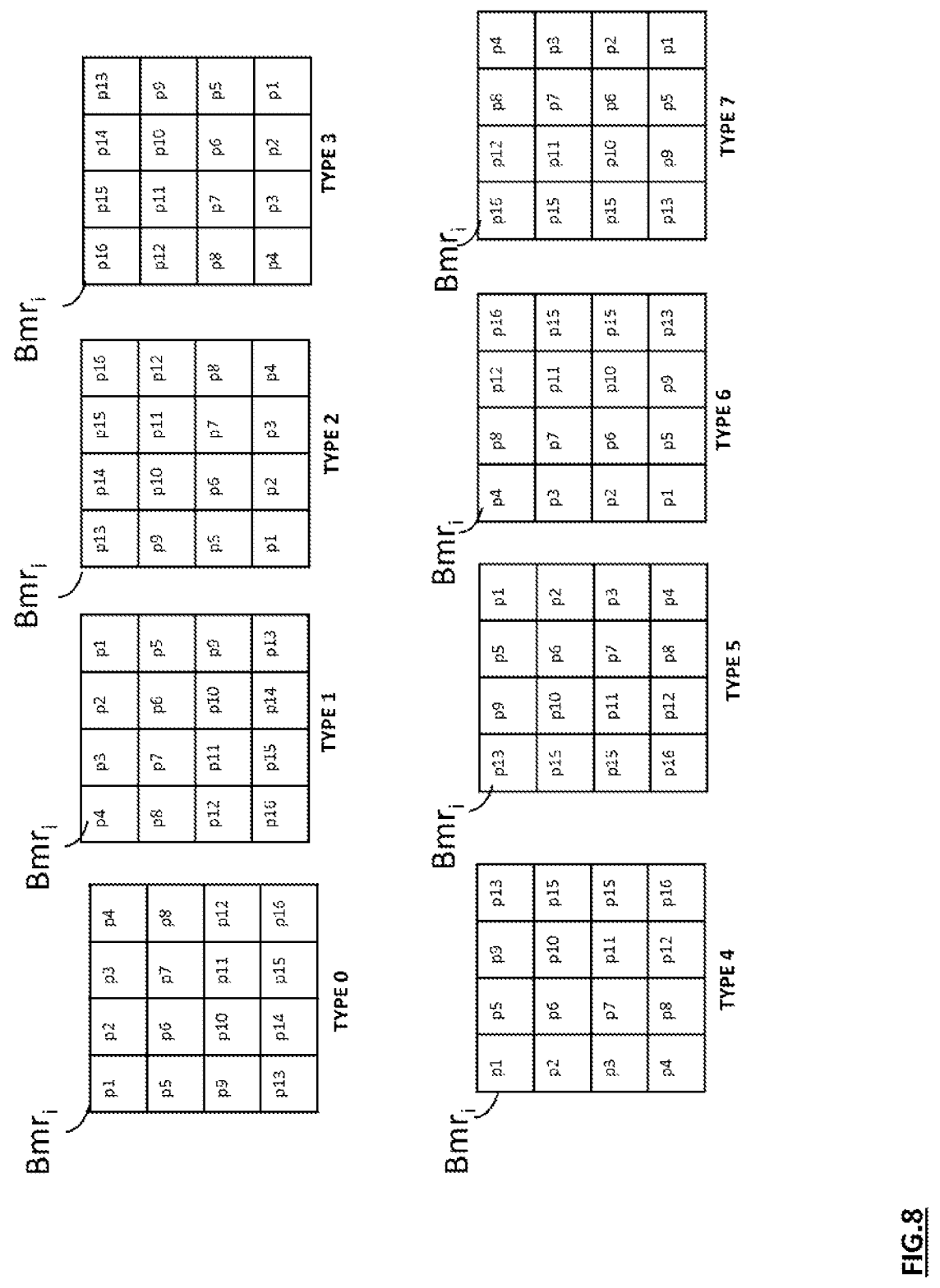

With reference to FIG. 8, there exist eight different possible types of displacement numbered from 0 to 7 which allow a given pixel of the residual block Br; to preserve its neighboring pixels. For example, for the pixel p7, the latter is always surrounded by the pixels p2, p3, p4, p6, p8, p10, p11 and p12. In a particular manner, the mirror rotation of type 0 which is applied to the residual block $Br_i$, makes it possible to obtain a modified residual block $Bmr_i$ which, in the present case, is the same as the residual block $Br_i$.

Furthermore, in accordance with the invention, a direction of Intra prediction is associated with one of the eight types of displacement, according to its mode of grouping. For example:
- the directions of intra prediction $DPI_{22}$ and $DPI_6$ associated with the same transform or with the same set of transforms are themselves associated respectively with the mirror rotations of type 0 and of type 5 such as are represented in FIG. 8,
- the directions of intra prediction $DPI_4$ and $DPI_{16}$ associated with the same transform or with the same set of transforms are themselves associated respectively with the mirror rotations of type 0 and of type 2 such as are represented in FIG. 8,
- the directions of intra prediction $DPI_{20}$ and $DPI_{32}$ associated with the same transform or with the same set of transforms are themselves associated respectively with the mirror rotations of type 0 and of type 1 such as are represented in FIG. 8,
- the directions of intra prediction $DPI_4$, $DPI_{16}$, $DPI_{20}$ and $DPI_{32}$ associated with the same transform or with the same set of transforms are themselves associated respectively with the mirror rotations of type 6, of type 4, of type 0 and of type 1, such as are represented in FIG. 8.

Figure 9:
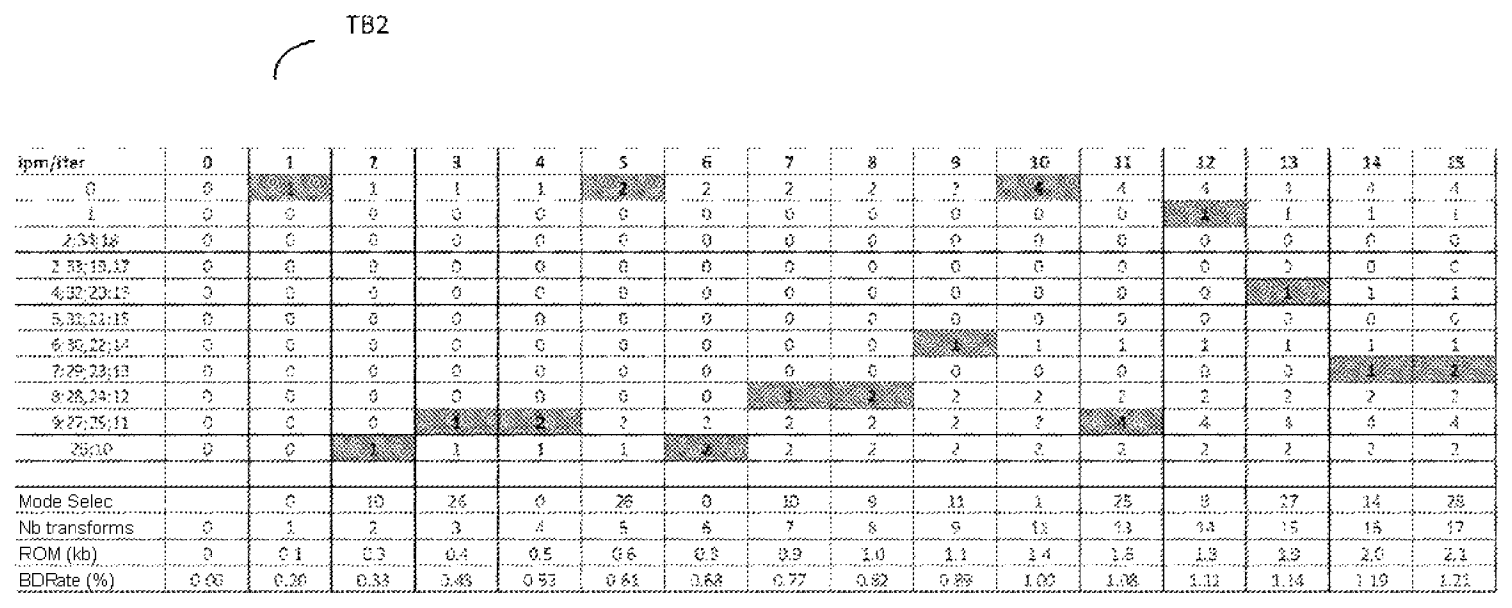

With reference now to FIG. 9 is illustrated table TB2 which presents how, over the first fifteen iterations performed, the bitrate gain (BDRate) is improved as a function of the iterations, as the memory resources (ROM) increase, when at least two modes of prediction are associated with one and the same set of transforms.

Thus for example, at iteration iter=15, as represented in the last column of table TB2, it is the value of the ratio a_28 which is the most favorable and which corresponds to the mode of intra prediction 28. This mode is indicated at the bottom of the third column of the table in association with:
- the bitrate $R_{15}$ saved with respect to a coding method of the prior art, i.e. $R_{15}$=1.21%,
- the memory $M_{15}$ added with respect to a coding method of the prior art, i.e. $M_{15}$=2.1 kb.

Moreover, at iteration iter=15 is represented the number of transforms which have been added per mode of prediction or per groups of modes of prediction. Thus:
- for the mode of intra prediction 1 and the aforementioned groups $G_3$ and $G_5$ of directions of intra prediction, a single transform has been respectively added,
- for the aforementioned groups $G_6$, $G_7$ and $G_9$ of directions of intra prediction, two transforms have been respectively added,
- for the mode of intra prediction 0 and the aforementioned group $G_8$ of directions of intra prediction, four transforms have been respectively added.

For iteration iter=15, a total of seventeen transforms has therefore been added.

Table TB2 makes it possible to note a significant reduction in the memory resources dedicated to the storage of the transforms of the order of 20% with respect to the coding method which does not use such a grouping of the modes of prediction.

In order to assess the gain afforded with such a grouping of modes of prediction according to the invention, the gain being evaluated in terms of storage capacity for envisaged coding performance, is presented the table hereinbelow which gives a comparative overview of the fixed storage capacities present in a coder of the prior art using one and the same number of transforms per mode of prediction and of the variable storage capacities present in the coder according to the invention, and of the storage capacity reduction obtained with the variable storage capacities.

| Bitrate gain (BDRate) (%) | Fixed storage capacity (kb) | Variable storage capacity (kb) | Storage capacity reduction (%) |
| --- | --- | --- | --- |
| 0.8 | 4.4 | 1 | 77 |
| 1.3 | 8.8 | 2.5 | 71 |
| 1.7 | 17.5 | 5.3 | 70 |

Thus, for an envisaged bitrate gain of 1.7%, the storage capacity of the coders which use a fixed number of transforms per mode of prediction is 17.5 kb, whilst the storage capacity of the coders according to the invention which use a variable number of transforms per mode of prediction or per set of modes of prediction is only 5.3 kb. The reduction in the storage capacities of the coders according to the invention with respect to the coders of the state of the art can thus be estimated at 70% for the envisaged bitrate gain of 1.7%.

According to another embodiment of the invention, the iterative method for determining the number of transforms per mode of prediction or per group of modes of prediction can be replaced with an automatic method for determining said number of transforms.

The automatic determination method may turn out to be necessary when, in certain coding contexts, the coder C0 of FIG. 2 is constrained to operate at a given complexity point. It is then necessary, in the course of the coding, to reduce the number of transforms in competition so as to limit the investigations of choice by the coder of the optimal transform, in the course of step C5 of FIG. 1.

According to a first exemplary embodiment, the number of transforms which is determined in the case of a mode of prediction associated with a vertical or horizontal direction of prediction is rendered greater than the number of transforms which is determined in the case of a mode of prediction associated with an oblique direction of prediction.

In the case for example of the HEVC standard, the person skilled in the art is aware that from among the thirty-five available modes of intra prediction, the modes 0 (Planar) and 1 (DC) are the most smoothed modes since the prediction according to these two modes is calculated by averaging more than two pixels of an edge of the current block. Consequently, the Planar and DC modes are associated, in the course of step C0 of FIG. 1, with a greater number of transforms than that of the other HEVC intra prediction modes.

Moreover, in a manner known per se, the modes 10 (Horizontal) and 26 (Vertical) are used to predict patterns of the image which are horizontal or vertical. Such patterns being found frequently in nature (e.g.: vertical trees, poles, horizon line, etc.), they must be associated with a higher number of transforms than the number of transforms which is associated with the oblique modes of intra prediction.

According to a second exemplary embodiment, the number of transforms which is determined in the case of a mode of prediction which has been selected beforehand, in the plurality of predetermined modes of prediction $MP_0$, $MP_1, \ldots, MP_v, \ldots, MP_R$, as most probable mode of prediction, is greater than the number of transforms which is determined in the case of a mode of prediction which has not been selected beforehand as most probable mode of prediction.

In the case for example of the HEVC standard, a list of the most probable modes of prediction, called MPMs ("Most Probable Modes"), is compiled prior to the coding. In particular, the modes 0 (Planar), 1 (DC) and 26 (vertical) are the modes of prediction assigned by default when compiling the list. According to the invention, these three modes of intra prediction are therefore associated beforehand, in the course of the storage step C0 of FIG. 1, with a higher number of transforms than the number of transforms which is associated with the other HEVC intra prediction modes.

According to a third exemplary embodiment, the number of transforms contained in the set of transforms which is stored in association with each of the predetermined modes of prediction $MP_0, MP_1, \ldots, MP_v, \ldots, MP_R$ is determined as a function of the amount of information representative of each of these modes of prediction.

In the case for example of the HEVC standard, the most probable modes of intra prediction such as 0 (Planar), 1 (DC) and 26 (vertical) will be signaled on fewer bits than the other modes. According to the invention, it is therefore opportune to associate with them a higher number of transforms than that of the other modes of intra prediction, since these three modes will be chosen more frequently than the others and consequently, there will be a bigger variety of predictor blocks to be tested with these three modes.

Thus, according to the invention, if the signaling of a mode of prediction is carried on fewer bits, then the number of transforms, which is stored in association with this mode of prediction in the course of step C0 of FIG. 1, is bigger than the average of the transforms over the set of the thirty-five modes of intra prediction.

Detailed Description of the Decoding Part

An embodiment of the invention will now be described, in which the decoding method according to the invention is used to decode a data signal or stream representative of an image or of a sequence of images which is able to be decoded by a decoder compliant with any one of the current or forthcoming video decoding standards.

In this embodiment, the decoding method according to the invention is for example implemented in a software or hardware manner by modifications of such a decoder.

Figure 11:
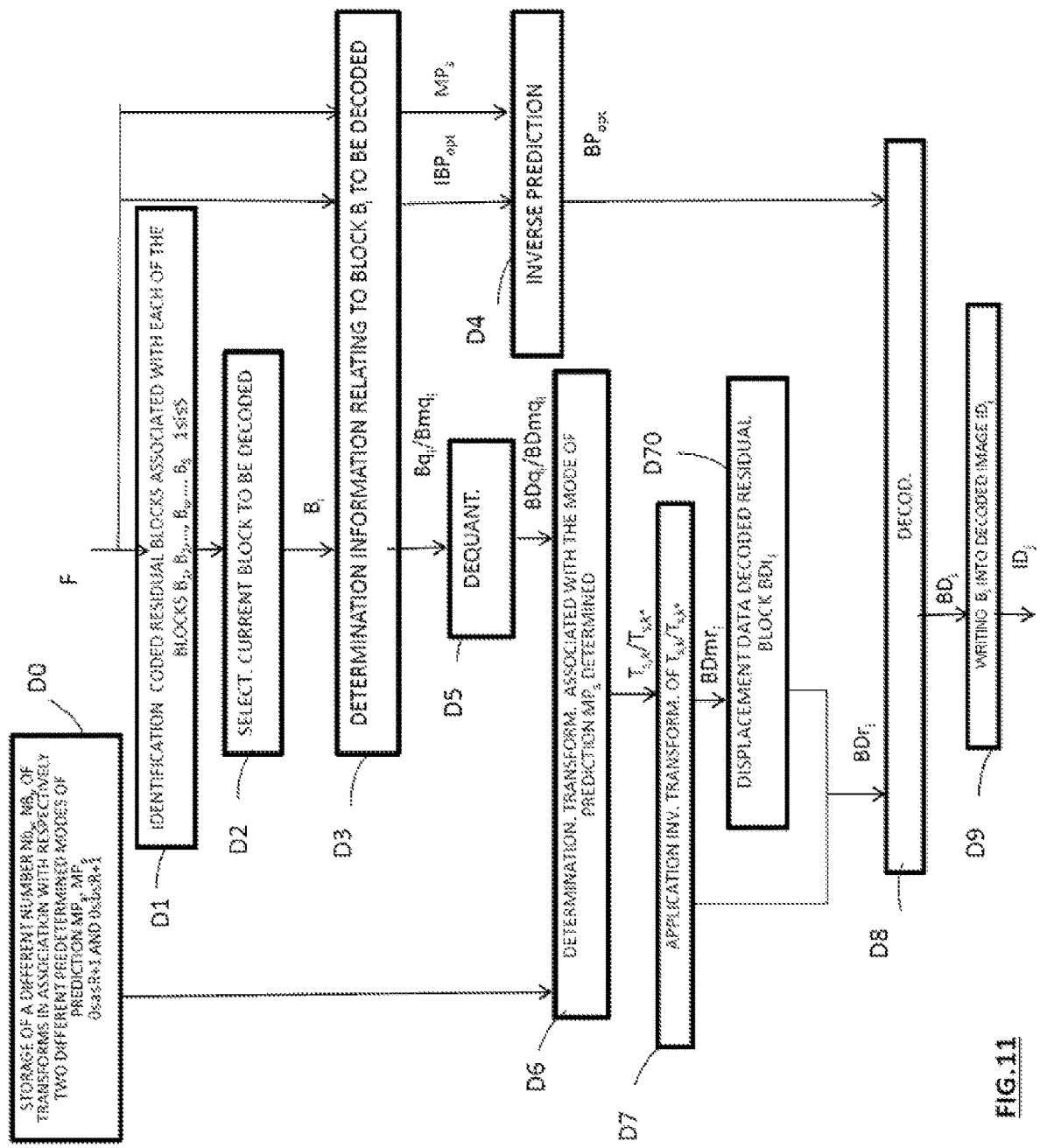
FIG. 11 represents the main steps of the decoding method according to the invention.

The decoding method according to the invention is represented in the form of an algorithm comprising steps D0 to D9 such as represented in FIG. 11.

Figure 10:
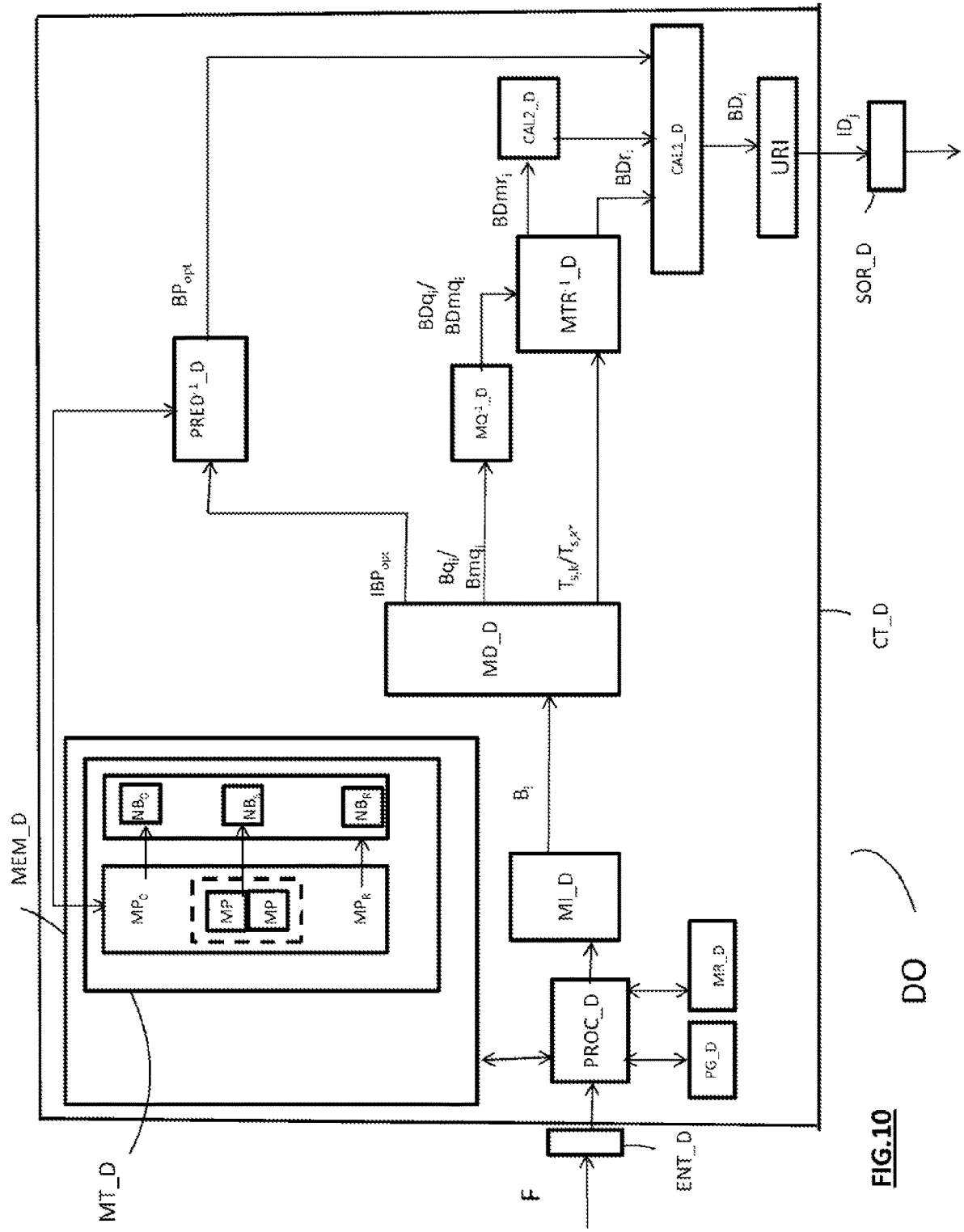
FIG. 10 represents an embodiment of a decoding device according to the invention.

According to this embodiment, the decoding method according to the invention is implemented in a decoding device or decoder D0 represented in FIG. 10.

As illustrated in FIG. 10, such a decoder device comprises:
an input ENT_D for receiving the current data signal or stream F to be decoded,
a processing circuit CT_D for implementing the decoding method according to the invention, the processing circuit CT_D containing:
a memory MEM_D comprising a buffer memory MT_D,
a processor PROC_D driven by a computer program PG_D,
an output SOR_D for delivering a reconstructed current image containing the data obtained on completion of the decoding according to the method of the invention.

On initialization, the code instructions of the computer program PG_D are for example loaded into a RAM memory, MR_D, before being executed by the processing circuit CT_D.

The decoding method represented in FIG. 11 applies to a data signal or stream F representative of a current image $IC_j$ to be decoded which is a still or which belongs to a sequence of images to be decoded.

For this purpose, information representative of the current image $IC_j$ to be decoded is identified in the data signal F received at the input ENT_D of the decoder D0 and such as delivered on completion of the coding method of FIG. 1.

With reference to FIG. 11, in the course of a step D1, there is undertaken the determination in the signal F of the coded residual blocks associated with each of the blocks $B_1, B_2, \ldots, B_i, \ldots, B_S$ previously coded in accordance with the aforementioned lexicographic order.

Such a determination step D1 is implemented by a stream analysis identification software module MI_D, such as represented in FIG. 10, which module is driven by the processor PROC_D.

Other types of traversal than that mentioned hereinabove are of course possible and depend on the order of traversal chosen on coding.

In the example represented, the blocks $B_1, B_2, \ldots, B_i, \ldots, B_S$ to be decoded have for example a square shape and are for example of size M×M pixels where M is a natural integer greater than or equal to 1.

Each block to be decoded can moreover be itself divided into sub-blocks which are themselves subdivisible.

In the course of a step D2 represented in FIG. 11, the decoder D0 of FIG. 10 selects, as current block $B_i$ to be decoded, the first block which has been coded on completion of the coding method of FIG. 1.

In the course of a step D3 represented in FIG. 11, there is undertaken a determination, for example by decoding, of the residual data $d_1, d_2, \ldots, d_w, \ldots, d_V$ associated with the current block $B_i$ to be decoded, which have been coded in the course of step C8 of FIG. 1. On completion of such a determination are obtained:
either a set of digital information associated with the quantized block $Bq_i$ obtained on completion of step C7,
or a set of digital information associated with the quantized modified block $Bmq_i$ obtained on completion of step C7, in the case where step C40 of displacing the data of the residual block $Br_i$ has been implemented on coding.

Also in the course of step D3 is determined information relating to the type of prediction of the current block $B_i$ such as implemented on coding in the course of step C3 of FIG. 1, and which has been written into the data signal F.

For this purpose, in the course of step D3, are determined:
the mode of prediction $MP_s$ selected in step C3 of FIG. 1,
the index of the predictor block $BP_{opt}$, denoted $IBP_{opt}$, and the type of partitioning of the current block $B_i$ if the latter has been partitioned.

Such a decoding step D3 is implemented by a decoding module MD_D represented in FIG. 10, which module is driven by the processor PROC_D.

In the course of a step D4 represented in FIG. 11, there is undertaken the predictive decoding of the current block to be decoded with the aid of the index $IBP_{opt}$ of the predictor block which has been decoded in the course of the aforementioned step D3. For this purpose, in a manner known per se, there is undertaken, in association with the index $IBP_{opt}$, the selection, in the buffer memory MT_D of the decoder D0 of FIG. 10, of the corresponding predictor block $BP_{opt}$ which figures among a plurality of candidate predictor blocks stored beforehand in the buffer memory MT_D. Each of the candidate predictor blocks is a block of pixels which has already been decoded.

Step D4 is implemented by an inverse prediction software module $PRED^{-1}\_D$, such as represented in FIG. 10, which is driven by the processor PROC_D.

In the course of a step D5 represented in FIG. 11, which is implemented in the case where it is the data set associated with the coded block $Bq_i$ or $Bmq_i$ which has been obtained on completion of the aforementioned step D3, there is undertaken a dequantization of this data set, according to a conventional dequantization operation which is the operation inverse to the quantization implemented during the quantization step C7 of FIG. 1. A current set of dequantized coefficients $BDq_i$ or a current set of dequantized modified coefficients $BDmq_i$ is then obtained on completion of step D5. Such a dequantization step is for example of scalar or vector type.

Step D5 is performed by means of an inverse quantization software module $MQ^{-1}\_D$, such as represented in FIG. 10, which module is driven by the processor PROC_D.

In the course of a step D6 represented in FIG. 11, the decoder D0 of FIG. 10 undertakes the determination of a transform of the current set of dequantized coefficients $BDq_i$ or of the current set of dequantized modified coefficients $BDmq_i$, such as is obtained in the aforementioned step D5. In a manner known per se, such a transform is a transform inverse to that determined on coding on completion of step C5 of FIG. 1, such as for example:
a direct transform such as for example a discrete cosine transform of DCT type,
a direct transform such as for example a discrete sine transform of DST type,
a block transform optimized in terms of distortion bitrate as presented in the publication "*Rate-distortion optimised transform competition for intra coding in HEVC*", Adrià Arrufat, Pierrick Philippe, Olivier Déforges, IEEE VCIP, December 2014,
a wavelet transform of the DWT type,
a transform including an overlap of the Lapped Transforms type such as presented in the publication "Reduction of blocking effects in image coding with a lapped orthogonal transform", H. Malvar,
or utilizable transforms of any other type.

Said transform belongs to a set of transforms which, in the course of a prior storage step D0 represented in FIG. 11, is stored in association with the mode of prediction $MP_s$, in the buffer memory MT_D of FIG. 10. In the course of this storage step:
the predetermined mode of prediction $MP_0$ is stored in association with a set of transforms containing a number $NB_0$ of transforms,
the predetermined mode of prediction $MP_1$ is stored in association with a set of transforms containing a number $NB_1$ of transforms,
the predetermined mode of prediction $MP_v$ is stored in association with a set of transforms containing a number $NB_v$ of transforms,
the predetermined mode of prediction $MP_R$ is stored in association with a set of transforms containing a number $NB_R$ of transforms.

In accordance with the invention, for at least two different modes of prediction $MP_a$, $MP_b$ belonging to the plurality of predetermined modes of prediction $MP_0$, $MP_1$, ..., $MP_v$, ..., $MP_R$, with $0 \leq a \leq R+1$ and $0 \leq b \leq R+1$, the number of transforms, denoted $NB_a$, which is contained in the set of transforms which is associated with the mode of prediction $MP_a$ is different from the number of transforms, denoted $NB_b$, which is contained in a set of transforms which is stored in association with the mode of prediction $MP_b$.

According to a first exemplary embodiment, for at least two sets of transforms stored respectively in association with two modes of prediction of said plurality $MP_0$, $MP_1$, ..., $MP_v$, ..., $MP_R$ of predetermined modes of prediction, the number of transforms in each of said two sets contains in common at least one identical transform.

For example, in the case of a decoding according to the HEVC standard, the number of transforms in each of said two sets may for example contain in common:
a transform inverse to a transform of DST type, or else a transform inverse to a transform of DCT type,
a transform inverse to a transform of DST type and a transform inverse to a transform of DCT type,
more than two transforms in common.

Moreover, more than two sets of transforms can contain in common at least one identical transform operation. Still in the case of a decoding according to the HEVC standard, and more particularly in the case of an inverse Intra prediction compliant with this standard which proposes thirty-five possible directions of prediction $DPI_0$, $DPI_1$, ..., $DPI_{34}$, the sets of transforms which are associated respectively with each of these thirty-five directions of prediction can contain in common at least one identical transform operation.

According to a second exemplary embodiment represented in FIG. 10, the set of transforms, associated with said mode of prediction $MP_s$ determined in the aforementioned step D3 and containing a number $NB_s$ of transforms, is stored in the buffer memory MT_D of FIG. 10, in association with at least one other mode of prediction, denoted $MP_u$, of said plurality of predetermined modes of prediction $MP_0$, $MP_1$, ..., $MP_v$, ..., $MP_R$, with $0 \leq u \leq R+1$.

More particularly, the aforementioned determination step D6 consists in reading in the data signal F the index IDX of the transform $T_{s,k}$ ($NB_s = 1$) or $T_{s,k^*}$ ($NB_s > 1$) which has been selected on coding on completion of the aforementioned step C5 (FIG. 1), which index has been written into the data signal F in the course of the aforementioned step C8 (FIG. 1).

In the course of a step D7 represented in FIG. 11, there is undertaken the application of the transform inverse to the transform $T_{s,k}$ or $T_{s,k^*}$ to the current set of dequantized coefficients $BDq_i$ or to the current set of dequantized modified coefficients $BDmq_i$, such as is obtained in the aforementioned step D5. On completion of step D7, either a current decoded residual block BDr$_i$, or a current decoded modified residual block BDmr$_i$ is obtained.

Such an operation is performed by an inverse transform software module MTR$^{-1}$_D, such as represented in FIG. 10, which module is driven by the processor PROC_D.

In FIG. 11, the dequantization step D5 is represented before the inverse transform application step D7. However, step D5 can be integrated into step D7 which is then implemented with integer numbers including the dequantization factor.

In the course of a step D8 represented in FIG. 11, there is undertaken the reconstruction of the current block B$_i$ by adding the predictor block BP$_{opt}$ which has been obtained on completion of the aforementioned step D4 to the decoded residual block BDr$_i$, obtained on completion of the aforementioned step D7. On completion of step D8, a current decoded block BD$_i$ is obtained.

Step D8 is implemented by a software module CAL1_D represented in FIG. 10, which module is driven by the processor PROC_D.

In the course of a step D9 represented in FIG. 11, said current decoded block BD$_i$ is written into a decoded image ID$_j$.

Such a step is implemented by an image reconstruction software module URI such as represented in FIG. 10, said module being driven by the processor PROC_D.

The decoding steps which have just been described hereinabove are implemented for all the blocks B$_1$, B$_2$, . . . , B$_i$, . . . , B$_S$ to be decoded of the current image IC$_j$ considered, in a predetermined order which is for example lexicographic order.

In the same manner as on coding, with reference to FIGS. 3 to 8, the decoding method implements, according to a first embodiment of the invention, a method for determining the number of transforms for each predetermined mode of prediction, in the case of an HEVC decoding of Intra type.

An embodiment of the invention implemented in the case of an HEVC decoding of Intra type, and in which the set of transforms which is associated with a mode of intra prediction determined in the course of step D3 of FIG. 11 is stored beforehand in association with at least one other mode of prediction of said plurality of predetermined modes of prediction, will now be described with reference to FIGS. 3, 6A, 6B, 7 to 11.

In this example, on completion of step D3 of FIG. 11, the optimal predictor block BP$_{opt}$ obtained is associated with an optimal direction of Intra prediction which is for example the direction DPI$_{22}$.

In accordance with the present embodiment, the transform (if unique) or the set of transforms which is(are) associated with the direction of Intra prediction DPI$_{22}$ is associated beforehand, in the course of step D0 of FIG. 11, with another direction of Intra prediction, on condition that this other direction of Intra prediction is symmetric with respect to the direction of Intra prediction DPI$_{22}$. In this manner, half as many transforms are stored at the level of the decoder D0, the advantage being a reduction in the memory on the decoder side.

According to a first variant, two directions of Intra prediction exhibiting symmetries are associated with the same transform or with the same set of transforms.

According to a second variant, two angular directions of Intra prediction each exhibiting identical angles with respect to a vertical (or horizontal) direction are associated with the same transform or with the same set of transforms.

Thus, as represented in FIG. 6A, an angular direction of Intra prediction exhibiting an angle of 30° with respect to a horizontal axis AH is associated with an angular direction of Intra prediction exhibiting symmetrically an angle of –30° with respect to this horizontal axis. With reference to FIG. 7, these two directions of Intra prediction correspond respectively to the directions DPI$_4$ and DPI$_{16}$.

Similarly, as represented in FIG. 6A, an angular direction of Intra prediction exhibiting an angle of –60° with respect to a horizontal axis is associated with an angular direction of Intra prediction exhibiting symmetrically an angle of –120° with respect to a vertical axis AV. With reference to FIG. 7, these two directions of Intra prediction correspond respectively to the directions DPI$_{20}$ and DPI$_{32}$.

Still in accordance with the example which has just been described and according to yet another embodiment, the transform or the plurality of transforms which is(are) associated with the direction of Intra prediction DPI$_{22}$ determined in step D3 is associated beforehand with three other directions of Intra prediction, on condition that these other directions of Intra prediction are symmetric with respect to the direction of Intra prediction DPI$_{22}$. In this manner, a quarter as many transforms are stored at the level of the decoder D0, the advantage being a reduction in the memory on the decoder side.

According to a first variant, four directions of Intra prediction exhibiting symmetries are associated with the same transform or with the same set of transforms.

According to a second variant, four angular directions of Intra prediction each exhibiting identical angles with respect to a vertical, horizontal and diagonal axis are associated with the same transform or with the same set of transforms.

Thus, as represented in FIG. 6A, an angular direction of Intra prediction exhibiting an angle of 30° with respect to the horizontal axis AH is associated:

with an angular direction of Intra prediction of an angle of –30° by symmetry with respect to this horizontal axis,
  with an angular direction of Intra prediction exhibiting an angle of –60° by symmetry with respect to this horizontal axis and then with respect to a diagonal axis AD,
  with an angular direction of Intra prediction exhibiting an angle of –120° by symmetry with respect to the diagonal axis AD.

With reference to FIG. 7, these four directions of Intra prediction correspond respectively to the directions DPI$_4$, DPI$_{16}$, DPI$_{20}$ and DPI$_{32}$.

The table hereinbelow represents nine groups G$_1$ to G$_9$ of directions of HEVC Intra prediction, with which groups can be associated one and the same transform (if unique) or else a set of transforms, such as determined according to the invention.

| Group | Index of directions of Intra prediction | | | |
|---|---|---|---|---|
| G$_1$ | 2 | 34 | 18 | |
| G$_2$ | 3 | 33 | 19 | 17 |
| G$_3$ | 4 | 32 | 20 | 16 |
| G$_4$ | 5 | 31 | 21 | 15 |
| G$_5$ | 6 | 30 | 22 | 14 |
| G$_6$ | 7 | 29 | 23 | 13 |
| G$_7$ | 8 | 28 | 24 | 12 |
| G$_8$ | 9 | 27 | 25 | 11 |
| G$_9$ | 10 | 26 | | |

The angular directions at multiples of 45° (45°, –45° and –135°) such as represented in FIG. 6B, corresponding respectively to the directions of prediction DPI$_2$, DPI$_{18}$ and $DPI_{34}$, as illustrated in FIG. 7, are grouped together in threes and are associated, in the buffer memory MT_D of the decoder D0 of FIG. 10, with one and the same transform or with one and the same set of transforms.

In accordance with the obtaining of the aforementioned groups of modes of prediction, with reference to FIG. 11, in the case where it is the current decoded modified residual block $BDmr_i$ which has been obtained on completion of step D7, there is undertaken, following on from this step, a step D70 of at least one displacement of the data of the current decoded modified residual block $BDmr_i$, each datum considered being displaced inside this block while preserving its closest neighbors.

Step D70 is implemented by a calculation software module CAL2_D such as represented in FIG. 10, which module is driven by the processor PROC_D.

According to a first embodiment, a type of data displacement is a transposition, inverse to that performed on coding, namely an exchange of the row and column coordinates of a datum of the current decoded modified residual block $BDmr_i$.

According to a second embodiment, a type of data displacement is a mirror, inverse to that performed on coding, namely an exchange of the columns or rows of the current decoded modified residual block $BDmr_i$. Each datum considered in the current decoded modified residual block $BDmr_i$ is thus displaced inside the latter, while preserving its closest neighbors.

According to a third embodiment, a type of data displacement is a combination of the inverse transposition and of the inverse mirror, that is to say:
- either the application of a displacement of inverse transposition type followed by the application of a displacement of inverse mirror type to the data of the current decoded modified residual block $BDmr_i$,
- or the application of a displacement of inverse mirror type followed by the application of a displacement of inverse transposition type to the data of the current decoded modified residual block $BDmr_i$.

Furthermore, according to another embodiment of the invention, the type of data displacement in the current decoded modified residual block $BDmr_i$ is dependent on the mode of prediction $MP_s$ determined in the aforementioned step D3.

In a manner corresponding to the various types of displacement implemented on coding, such as are represented in FIG. 8, there also exist, on decoding, eight different possible types of displacement numbered from 0 to 7 which allow a given pixel of the current decoded modified residual block $BDmr_i$ to preserve its neighboring pixels. For example, for the pixel p7, the latter is always surrounded by the pixels p2, p3, p4, p6, p8, p10, p11 and p12. In a particular manner, the mirror rotation inverse to the mirror rotation of type 0 does not bring about a displacement of the data since the data of the current decoded modified residual block $BDmr_i$ are arranged in the same order as the data of the current residual block $Br_i$.

Furthermore, in accordance with the invention, a direction of Intra prediction determined on completion of step D3 of FIG. 11 is associated with one of the eight types of inverse displacement, according to the group to which it belongs. For example:
- the directions of intra prediction $DPI_{22}$ and $DPI_6$ associated with the same transform or with the same set of transforms are themselves associated respectively with the inverse mirror rotations respectively of the mirror rotations of type 0 and of type 5 such as are represented in FIG. 8,
- the directions of intra prediction $DPI_4$ and $DPI_{16}$ associated with the same transform or with the same set of transforms are themselves associated respectively with the inverse mirror rotations respectively of the mirror rotations of type 0 and of type 2 such as are represented in FIG. 8,
- the directions of intra prediction $DPI_{20}$ and $DPI_{32}$ associated with the same transform or with the same set of transforms are themselves associated respectively with the inverse mirror rotations respectively of the mirror rotations of type 0 and of type 1 such as are represented in FIG. 8,
- the directions of intra prediction $DPI_4$, $DPI_{16}$, $DPI_{20}$ and $DPI_{32}$ associated with the same transform or with the same set of transforms are themselves associated respectively with the inverse mirror rotations respectively of the mirror rotations of type 6, of type 4, of type 0 and of type 1, such as are represented in FIG. 8.

According to another embodiment of the invention, in the same manner as on coding, the iterative method for determining the number of transforms per mode of prediction or per group of modes of prediction can be replaced with an automatic method for determining said number of transforms.

The automatic determination method may turn out to be necessary when, in certain decoding contexts, the decoder D0 of FIG. 10 is constrained to operate at a given complexity point. This given complexity point can be signaled by the encoder C0 of FIG. 2, by an item of configuration information given for an image part, a whole image or for a sequence of images. It can comprise an identifier of the maximum number of transforms or else a ratio of the number of transforms with respect to the available number of transforms at the decoder. Thus, in the course of step D6 of FIG. 11, the decoder D0 searches in the buffer memory MT_D of FIG. 10, solely in the number of transforms which is associated with said signaled item of configuration information, for the transform selected on coding and corresponding to the index IDX determined in step D3.

According to a first exemplary embodiment, the number of transforms which is determined in the case of a mode of prediction associated with a vertical or horizontal direction of prediction is rendered greater than the number of transforms which is determined in the case of a mode of prediction associated with an oblique direction of prediction.

In the case for example of the HEVC standard, the person skilled in the art is aware that from among the thirty-five available modes of intra prediction, the modes 0 (Planar) and 1 (DC) are the most smoothed modes since the prediction according to these two modes is calculated by averaging more pixels of the edges of the current block. Consequently, the Planar and DC modes are associated, in the course of step D0 of FIG. 11, with a greater number of transforms than that of the other HEVC intra prediction modes.

Moreover, in a manner known per se, the modes 10 and 26 are used to predict patterns of the image which are horizontal or vertical. Such patterns being found frequently in nature (e.g.: vertical trees, poles, horizon line, etc.), they must be associated with a higher number of transforms than the number of transforms which is associated with the oblique modes of intra prediction.

According to a second exemplary embodiment, the number of transforms which is determined in the case of a mode of prediction which has been selected beforehand, in the plurality of predetermined modes of prediction $MP_0$, $MP_1, \ldots, MP_v, \ldots, MP_R$, as most probable mode of prediction, is greater than the number of transforms which is determined in the case of a mode of prediction which has not been selected beforehand as most probable mode of prediction.

In the case for example of the HEVC standard, a list of the most probable modes of prediction, called MPMs ("Most Probable Modes"), is compiled prior to the coding. In particular, the modes 0 (Planar), 1 (DC) and 26 (vertical) are the modes of prediction assigned by default when compiling the list. According to the invention, these three modes of intra prediction are therefore associated beforehand, in the course of the storage step D0 of FIG. 1A, with a higher number of transforms than the number of transforms which is associated with the other HEVC intra prediction modes.

According to a third exemplary embodiment, the number of transforms contained in the set of transforms which is stored in association with each of the predetermined modes of prediction $MP_0, MP_1, \ldots, MP_v, \ldots, MP_R$ is determined as a function of the amount of information representative of each of these modes of prediction.

In the case for example of the HEVC standard, the most probable modes of intra prediction such as 0 (Planar), 1 (DC) and 26 (vertical) will be signaled on fewer bits than the other modes. According to the invention, it is therefore opportune to associate with them a higher number of transforms than that of the other modes of intra prediction, since these three modes will be chosen more frequently than the others and consequently, there will be a bigger variety of predictor blocks to be tested with these three modes.

Thus, according to the invention, if the signaling of a mode of prediction is carried on fewer bits, then the number of transforms, which is stored in association with this mode of prediction in the course of step D0 of FIG. 11, is bigger than the average of the transforms over the set of the thirty-five modes of intra prediction.

It goes without saying that the embodiments which have been described hereinabove have been given purely by way of wholly non-limiting indication, and that numerous modifications can be easily made by the person skilled in the art without thereby departing from the scope of the invention.

The invention claimed is:

1. A method comprising
coding at least one image split up into blocks, implementing by processing circuitry of a coding device, for a current block to be coded of said image:
predicting the current block in accordance with a mode of prediction selected by the coding device from among two predetermined modes of prediction Intra and Inter, the selected mode of prediction being Intra,
calculating a residual data block representative of a difference between a predictor block obtained on completion of the predicting and the current block,
applying a transform operation to data of said residual data block, said transform operation belonging to a set of transform operations which is stored in a non-transitory computer-readable medium in passociation with the selected mode of Intra prediction,
coding data obtained subsequent to said transform operation,
constructing a data signal containing said coding data and an index of said applied transform operation,
transmitting said data signal to a decoding device,
prior to coding the image, storing in the non-transitory computer-readable medium said set of transform operations in association with the selected mode of Intra prediction and a set of transform operations in association with the mode of Inter prediction, wherein the number of transform operations contained in the set of transform operations that is associated with said selected mode of Intra prediction is different from the number of transform operations contained in the set of transform operations that is stored in association with said mode of Inter prediction.

2. The coding method as claimed in claim 1, in which:
the set of transform operations that is associated with the mode of Intra prediction contains at least one separable transform operation and at least one non separable transform operation,
the set of transform operations that is associated with the mode of Inter prediction contains only at least one separable transform operation.

3. The coding method as claimed in claim 1, in which for said two sets of transform operations, the number of transform operations in each of said two sets contains in common at least one identical transform operation.

4. The coding method as claimed in claim 1, in which the set of transform operations which is associated with said selected mode of Intra prediction is stored in association with at least one other mode of prediction different from said two of predetermined modes of prediction.

5. A device for coding at least one image split up into blocks, comprising:
a non-transitory computer-readable medium comprising a set of transform operations stored thereon in association with each of two predetermined modes of prediction Intra and Inter;
a processing circuit which is configured to, for a current block to be coded of said image:
predict the current block in accordance with a mode of prediction selected from among the plurality of predetermined modes of prediction, the selected mode of prediction being Intra,
calculate a residual data block representative of a difference between a predictor block obtained on completion of the prediction and the current block,
apply a transform operation to data of said residual data block, said transform operation belonging to the set of transform operations that is stored in association with the selected mode of Intra prediction,
code data obtained subsequent to said transform operation,
construct a data signal containing said coding data and an index of said applied transform operation,
transmit said data signal to a decoding device,
wherein the number of transform operations contained in the set of transform operations that is associated with said selected mode of Intra prediction is different from the number of transform operations contained in the set of transform operations that is stored in association with said mode of Inter prediction.

6. A method comprising:
decoding a data signal representative of at least one image split up into blocks, implementing by processing circuitry of a decoding device, for a current block to be decoded:
determining, in said data signal:
data representative of a current residual block associated with the current block to be decoded,
a mode of prediction of the current block to be decoded, said mode of prediction belonging to two predetermined modes of prediction Intra and Inter, the determined mode of prediction being Intra,
an index of a transform operation, predicting the current block in accordance with the determined mode of Intra prediction, applying the transform operation corresponding to the determined index to the data representative of said residual block, said transform operation belonging to a set of transform operations which is stored in a non-transitory computer-readable medium in association with said determined mode of Intra prediction, reconstructing the current block with the aid of a predictor block obtained on completion of the prediction and of data obtained subsequent to said transform operation; and prior to decoding the data signal, storing in the non-transitory computer-readable medium the set of transform operations associated with the determined mode of Intra prediction and the set of transform operations associated with the mode of Inter prediction, wherein the number of transform operations contained in said set of transform operations associated with the determined mode of Intra prediction is different from the number of transform operations contained in the set of transform operations which is stored in association with said mode of Inter prediction.

7. The decoding method as claimed in claim 6, in which:
the set of transform operations that is associated with the mode of Intra prediction contains at least one separable transform operation and at least one non separable transform operation,
the set of transform operations that is associated with the mode of Inter prediction contains only at least one separable transform operation.

8. The decoding method as claimed in claim 6, in which for said two sets of transform operations, the number of transform operations in each of said two sets contains in common at least one identical transform operation.

9. The decoding method as claimed in claim 6, in which the set of transform operations which is associated with said determined mode of Intra prediction is stored in association with at least one other mode of prediction different from said mode of Inter prediction.

10. A device for decoding a data signal representative of at least one image split up into blocks, comprising:
a non-transitory computer-readable medium comprising a set of transform operations stored thereon in association with each of two predetermined modes of prediction Intra and Inter;
a processing circuit which is configured to, for a current block to be decoded:
determine, in said data signal:
data representative of a current residual block associated with the current block to be decoded,
a mode of prediction of the current block to be decoded, said mode of prediction being Intra,
an index of a transform operation,
predict the current block in accordance with the mode of Intra prediction,
apply the transform operation corresponding to the determined index to the data representative of said residual block, said transform operation belonging to the set of transform operations that is stored in association with said mode of Intra prediction,
reconstruct the current block with the aid of a predictor block obtained on completion of the prediction and of the data obtained subsequent to said transform operation,
wherein the number of transform operations contained in said set of transform operations that is associated with the determined mode of Intra prediction is different from the number of transform operations contained in the set of transform operations that is stored in association with the mode of Inter prediction.

11. The device for decoding as claimed in claim 10, in which:
the set of transform operations that is associated with the mode of Intra prediction contains at least one separable transform operation and at least one non separable transform operation,
the set of transform operations that is associated with the mode of Inter prediction contains only at least one separable transform operation.

12. A non-transitory computer-readable medium comprising a computer program stored thereon comprising program code instructions for execution of a method of decoding a data signal representative of at least one image split up into blocks, when said program is executed on a computer of a decoding device, wherein the method comprises:
implementing by the decoding device, for a current block to be decoded:
determining, in said data signal:
data representative of a current residual block associated with the current block to be decoded,
a mode of prediction of the current block to be decoded, said mode of prediction being Intra,
an index of a transform operation, predicting the current block in accordance with the mode of Intra prediction,
applying the transform operation corresponding to the determined index to the data representative of said residual block, said transform operation belonging to a set of transform operations which is stored in a non-transitory computer-readable medium in association with said mode of Intra prediction,
reconstructing the current block with the aid of a predictor block obtained on completion of the prediction and of data obtained subsequent to said transform operation; and
prior to decoding the data signal, storing in the non-transitory computer-readable medium the set of transform operations associated with the determined mode of Intra prediction and the set of transform operations associated with the mode of Inter prediction, wherein the number of transform operations contained in said set of transform operations associated with the determined mode of Intra prediction is different from the number of transform operations contained in the set of transform operations which is stored in association with said mode of Inter prediction.

* * * * *